(12) United States Patent
Yang et al.

(10) Patent No.: US 12,528,321 B2
(45) Date of Patent: Jan. 20, 2026

(54) SYSTEMS AND METHODS FOR POSITIONING ONE OR MORE COUPLING SENSORS ON AN AUTONOMOUS ELECTRIC-POWERED TRAILER

(71) Applicant: Pebble Mobility, Inc., Sunnyvale, CA (US)

(72) Inventors: Bingrui Yang, Los Altos, CA (US); Stefan Solyom, Los Altos, CA (US)

(73) Assignee: Pebble Mobility Inc., Fremont, CA (US)

( * ) Notice: Subject to any disclaimer, the term of this patent is extended or adjusted under 35 U.S.C. 154(b) by 0 days.

(21) Appl. No.: 19/093,888

(22) Filed: Mar. 28, 2025

(65) Prior Publication Data

US 2025/0303806 A1    Oct. 2, 2025

Related U.S. Application Data

(60) Provisional application No. 63/694,157, filed on Sep. 12, 2024, provisional application No. 63/572,161, filed on Mar. 29, 2024.

(51) Int. Cl.
*B60D 1/36* (2006.01)
*B60D 1/42* (2006.01)
*B60D 1/46* (2006.01)

(52) U.S. Cl.
CPC .................. *B60D 1/36* (2013.01); *B60D 1/42* (2013.01); *B60D 1/46* (2013.01)

(58) Field of Classification Search
CPC ............................... B60D 1/36; G05D 1/0287
See application file for complete search history.

(56) References Cited

U.S. PATENT DOCUMENTS

| | | | |
|---|---|---|---|
| 11,148,667 B2* | 10/2021 | Berkemeier | G05D 1/0231 |
| 12,036,832 B2* | 7/2024 | Yang | B60D 1/36 |
| 2017/0217372 A1* | 8/2017 | Lu | B60R 16/027 |
| 2019/0210479 A1* | 7/2019 | Bachmann | B60L 15/38 |
| 2020/0039517 A1* | 2/2020 | Berkemeier | B60W 30/18036 |
| 2023/0331050 A1* | 10/2023 | Yang | B60D 1/36 |
| 2023/0365209 A1* | 11/2023 | Yang | B62D 59/04 |

OTHER PUBLICATIONS

International Search Report and Written Opinion Dated Jul. 21, 2025 for International Application No. PCT/US2025/031520, 7 pages total.

* cited by examiner

*Primary Examiner* — Kevin Hurley
*Assistant Examiner* — Marlon A Arce
(74) *Attorney, Agent, or Firm* — Womble Bond Dickinson (US) LLP

(57) ABSTRACT

A trailer comprises a trailer chassis, a trailer enclosure supported by the trailer chassis, a trailer hitching assembly coupled to the trailer chassis. The trailer hitching assembly comprises a trailer coupler, and a tethering sensor configured to sense in a direction toward a tethering *nexus* of a tow vehicle. The trailer further comprises a processing unit that uses sensing data sensed by the tethering sensor to autonomously control a physical tethering of the trailer coupler to the tethering *nexus* of the tow vehicle.

20 Claims, 9 Drawing Sheets

200

```
┌ ─ ─ ─ ─ ─ ─ ─ ─ ─ ─ ─ ─ ─ ─ ┐
│   Establishing a Tethering Proximity 205   │
└ ─ ─ ─ ─ ─ ─ ─ ─ ─ ─ ─ ─ ─ ─ ┘
```

Sourcing Sensor Data S210

Computing Alignment Parameters S220

Computing Autonomous Movement Parameters S230

Executing Autonomous Operations S240

FIG. 2

SYSTEMS AND METHODS FOR POSITIONING ONE OR MORE COUPLING SENSORS ON AN AUTONOMOUS ELECTRIC-POWERED TRAILER

CROSS-REFERENCE TO RELATED APPLICATIONS

This application claims the benefit of U.S. Provisional Application No. 63/694,157, filed 12 Sep. 2024, and U.S. Provisional Application No. 63/572,161, filed 29 Mar. 2024; each of which is incorporated herein by reference in its entirety for all purposes.

TECHNICAL FIELD

This invention relates generally to the autonomous electric trailer field, and more specifically to a new and useful system and method for positioning one or more coupling sensors in the autonomous electric trailer field.

BACKGROUND

Modern vehicle trailer design and technology appear to be misaligned with the evolution, current technologies and designs of towing vehicles. In particular, standard vehicle trailers are designed to be passive entities that only move or stop when forces generated by a tow vehicle acts on these trailers. However, as a significant sum of modern vehicles are transitioning to alternative powering mechanisms (e.g., electric power) for driving and operating these modern vehicles, driving range often becomes a concern when a passive trailer is in tow. Similarly, lesser towing-capable vehicles (e.g., sedans or the like) that may use typical combustion engines may have difficulty towing standard trailers carrying challenging loads.

Additionally, various other headwinds caused by standard vehicle trailers include complications and difficulties in attaching the trailer to the tow vehicle. Typically, in order to connect a trailer to a tow vehicle, a user has to back up or move a tow vehicle into a position towards a trailer and further, create alignment between the tow vehicle and a coupling mechanism of the trailer. The traditional connection process is tedious and oftentimes involves multiple attempts and/or adjustments by the user to create a successful connection between the tow vehicle and trailer.

In the present application, one or more implementations of the invention provide methods and systems for an autonomous and assistive movement of an electric-powered trailer and for an autonomous tethering or hitching of the electric-powered trailer to a towing hitch or similar towing mechanism of a tow vehicle.

Thus, there is a need in the autonomous electric trailer field to create new and useful methods and systems for an autonomous and assistive movement of an electric-powered trailer and for an autonomous tethering or hitching of the electric-powered trailer to a towing hitch or similar towing mechanism of a tow vehicle.

The embodiments of the present application described herein provide technical solutions that address, at least, the need described above.

BRIEF SUMMARY OF THE EMBODIMENT(S)

In some embodiments, an autonomous electric-powered (AEP) trailer comprises: a trailer chassis; a trailer enclosure supported by the trailer chassis; a trailer hitching assembly coupled to the trailer chassis, wherein the trailer hitching assembly comprises: a trailer coupler, and a tethering sensor configured to sense in a direction toward a tethering nexus of a tow vehicle; and a processing unit that uses sensing data sensed by the tethering sensor to autonomously control a physical tethering of the trailer coupler to the tethering nexus of the tow vehicle.

In some embodiments, the tethering sensor comprises an image sensor, and sensing in the direction toward the tethering nexus of the tow vehicle at least includes: capturing an image of the tethering nexus from a viewing angle that is (e.g., substantially) perpendicular to the tethering nexus.

In some embodiments, the tethering sensor comprises an image sensor, an optical axis of the image sensor extends from a center of a lens of the image sensor and is (e.g., substantially) perpendicular to the tethering nexus, and a field of view of the image sensor includes the tethering nexus and does not include the trailer coupler.

In some embodiments, the tethering nexus includes a hitch ball, a maximum height of the hitch ball is defined as a perpendicular distance from a ground surface supporting a plurality of wheels of the AEP trailer to an apex of the hitch ball, a minimum height of the hitch ball is defined as a perpendicular distance from the ground surface to a nadir of the hitch ball, and at least a portion of the tethering sensor is positioned between the maximum height of the hitch ball and the minimum height of the hitch ball when the trailer coupler is physically tethered to the tethering nexus of the tow vehicle.

In some embodiments, the portion of the tethering sensor is not between the maximum height of the hitch ball and the minimum height of the hitch ball when the trailer coupler is not physically tethered to the tethering nexus of the tow vehicle.

In some embodiments, the tethering nexus includes a hitch ball, a hitch ball apex plane extends tangential to an apex of the hitch ball and is parallel to a ground surface that supports a plurality of wheels of the AEP trailer, a hitch ball nadir plane extends tangential to a nadir of the hitch ball and is parallel to the ground surface, and at least a portion of the tethering sensor is positioned between the hitch ball apex plane and the hitch ball nadir plane when the trailer coupler is physically tethered to the tethering nexus of the tow vehicle.

In some embodiments, a plurality of wheels of the autonomous electric-powered trailer are supported by a ground surface, the trailer hitching assembly includes a top portion and a bottom portion opposite the top portion, wherein the bottom portion of the trailer hitching assembly is closer to the ground surface than the top portion of the trailer hitching assembly, the trailer coupler is coupled to the top portion of the trailer hitching assembly, and the tethering sensor is coupled to the bottom portion of the trailer hitching assembly.

In some embodiments, the autonomous electric-powered trailer comprises a front and a back opposite the front, the trailer hitching assembly comprises a trailer hitching assembly length measured in a front-to-back direction, the trailer coupler extends from a starting position to an ending position along the trailer hitching assembly length, wherein the starting position of the trailer coupler is closer to the back of the autonomous electric-powered trailer than the ending position of the trailer coupler, the tethering sensor extends from a sensor starting position to a sensor ending position along the trailer hitching assembly length, wherein the starting sensor position of the tethering sensor is closer to the back of the autonomous electric-powered trailer than the sensor ending position of the tethering sensor, the sensor starting position is closer to the back of the autonomous electric-powered trailer than the starting position of the trailer coupler, and the ending position of the trailer coupler is closer to the front of the autonomous electric-powered trailer than the sensor ending position.

In some embodiments, the autonomous electric-powered trailer further includes a caster wheel coupled to the trailer hitching assembly, the trailer coupler and the tethering sensor are closer to the front of the autonomous electric-powered trailer than the caster wheel, and the tethering sensor is positioned on the bottom portion of the trailer hitching assembly adjacent to the trailer coupler.

In some embodiments, the autonomous electric-powered trailer includes an X-axis parallel to a ground surface supporting a plurality of wheels of the AEP trailer; the sensing data sensed by the tethering sensor at least includes: a first image of the tethering nexus captured when the trailer coupler is at a first position along the X-axis, and a second image of the tethering nexus captured when the trailer coupler is at a second position along the X-axis, closer to the tethering nexus than the first position; and a pixel representation of the tethering nexus in the second image is greater than in the first image.

In some embodiments, the pixel representation of the tethering nexus in the second image is greater than in the first image when a number of pixels corresponding to the tethering nexus in the second image is greater than a number of pixels corresponding to the tethering nexus in the first image.

In some embodiments, wherein using the sensing data to autonomously control the physical tethering of the trailer coupler to the tethering nexus of the tow vehicle includes: (1) identifying, via the processing unit, a real-world position of the tethering nexus based on the sensing data, (2) computing, via the processing unit, computer-executable tethering instructions based on the real-world position of the tethering nexus, (3) actuating, via the processing unit, a plurality of wheels of the AEP trailer in accordance with the computer-executable tethering instructions, and (4) repeating (1)-(3) until the trailer coupler is connected to the tethering nexus of the tow vehicle.

In some embodiments, the autonomous electric-powered trailer comprises an X-axis parallel to a ground surface supporting a plurality of wheels of the AEP trailer, and the computer-executable tethering instructions at least includes an X-axis positioning instruction that defines a target voltage to apply to the plurality of wheels for aligning the trailer coupler to an X-position of the tethering nexus along the X-axis.

In some embodiments, the autonomous electric-powered trailer comprises a Y-axis perpendicular to the ground surface supporting a plurality of wheels of the AEP trailer, and the computer-executable tethering instructions further define a Y-axis positioning instruction that defines the target voltage to apply to the plurality of wheels for aligning the trailer coupler to a Y-position of the tethering nexus along the Y-axis.

In some embodiments, the autonomous electric-powered trailer comprises a Z-axis perpendicular to the X-axis and the Y-axis, and the computer-executable tethering instructions further define a Z-axis positioning instruction that defines an amount to jack the trailer tongue to align the trailer coupler over the tethering nexus along the Z-axis.

In some embodiments, a trailer comprises: a trailer chassis; a trailer enclosure supported by the trailer chassis; a trailer hitching assembly coupled to the trailer chassis, wherein the trailer tongue comprises: a trailer coupler, and a tethering sensor configured to sense in a direction toward a tethering nexus of a tow vehicle; and a processing unit that uses sensing data sensed by the tethering sensor to autonomously control a physical tethering of the trailer coupler to the tethering nexus of the tow vehicle.

In some embodiments, the tethering sensor comprises an image sensor, and sensing in the direction toward the tethering nexus of the tow vehicle at least includes: capturing an image of the tethering nexus from a viewing angle that is (e.g., substantially) perpendicular to the tethering nexus.

In some embodiments, the tethering sensor comprises an image sensor, an optical axis of the image sensor extends from a center of a lens of the image sensor and is (e.g., substantially) perpendicular to the tethering nexus, and a field of view of the image sensor includes the tethering nexus and does not include the trailer coupler.

In some embodiments, a plurality of wheels of the trailer are supported by a ground surface, the trailer hitching assembly includes a top portion and a bottom portion opposite the top portion, wherein the bottom portion of the trailer hitching assembly is closer to the ground surface than the top portion of the trailer hitching assembly, the trailer coupler is coupled to the top portion of the trailer tongue, and the tethering sensor is coupled to the bottom portion of the trailer tongue.

In some embodiments, the trailer comprises a front and a back opposite the front, the trailer hitching assembly comprises a trailer hitching assembly length measured in a front-to-back direction, the trailer coupler extends from a starting position to an ending position along the trailer hitching assembly length, wherein the starting position of the trailer coupler is closer to the back of the trailer than the ending position of the trailer coupler, the tethering sensor extends from a sensor starting position to a sensor ending position along the trailer hitching assembly length, wherein the starting sensor position of tethering sensor is closer to the back of the trailer than the sensor ending position of the tethering sensor, the sensor starting position is closer to the back of the trailer than the starting position of the trailer coupler, and the ending position of the trailer coupler is closer to the front of the trailer than the sensor ending position.

In some embodiments, a method for implementing an automated tethering of an autonomous electric powered trailer and a tow vehicle includes: identifying, via one or more computers, a target tethering partner for an autonomous electric powered (AEP) trailer; identifying, by the AEP trailer, an n-dimensional position of a tethering nexus of the target tethering partner based on an assessment of sensor data; computing, via the one or more computers, a set of automated tethering instructions based on the identifying the n-dimensional position of the tethering nexus, wherein: (1) a first subset of the automated tethering instructions, when executed, causes the AEP trailer to autonomously maneuver into a state of alignment with the tethering nexus of the target tethering partner; and (2) a second subset of the automated tethering instructions, when executed, autonomously maneuvers the AEP trailer into a target coupler-to-tether arrangement that arranges a coupler of the AEP trailer adjacent to the n-dimensional position of the tethering nexus; and autonomously tethering, via the one or more computers, the coupler of the AEP trailer to the tethering nexus based on executing the set of automated tethering instructions.

In some embodiments, the AEP trailer comprises a steering component and one or more distinct motors operatively connected to one or more wheels of the AEP trailer, the set of automated tethering instructions at least include: (a) one or more motor control instructions for controlling a movement of the AEP trailer via the one or more wheels; and (b) one or more steering control instructions for controlling a steering direction of the steering component of the AEP trailer, and autonomously tethering the coupler of the AEP trailer to the tethering *nexus* includes: operating, via the one or more computers, each motor of the AEP trailer at a target voltage based on the one or more motor control instructions and the one or more steering control instructions.

In some embodiments, computing the set of automated tethering instructions includes: (i) identifying, via the one or more computers, an n-dimensional position of the coupler of the AEP trailer based on the assessment of the sensor data; and (ii) computing, via the one or more computers, at least one of (a) one or more motor control instructions, (b) one or more braking control instructions, (c) one or more steering control instructions, and (d) one or more jack control instructions that, when executed, causes the n-dimensional position of the coupler to align with the n-dimensional position of the tethering *nexus*.

In some embodiments, the tethering *nexus* emits an alignment traveling boundary signal, and computing the set of automated tethering instructions include: (a) identifying, via the one or more computers, an n-dimensional position of the coupler of the AEP trailer based on the assessment of the sensor data; (b) identifying, via the one or more computers, a vertex of the alignment traveling boundary signal; and (c) computing, via the one or more computers, at least one of (i) one or more motor control instructions, (ii) one or more braking control instructions, and (iii) one or more steering control instructions that, when executed, causes the n-dimensional position of the coupler to align with the vertex of the alignment traveling boundary signal.

In some embodiments, the target coupler-to-tether arrangement is achieved when the coupler of the AEP trailer is located at a pre-determined tether connection point associated with the tethering *nexus*, and computing the set of automated tethering instructions include: (i) identifying, via the one or more computers, an n-dimensional position of the pre-determined tether connection point associated with the tethering *nexus*; (ii) identifying, via the one or more computers, an n-dimensional position of the coupler of the AEP trailer based on the assessment of the sensor data; and (iii) computing, via the one or more computers, at least one of (a) one or more motor control instructions, (b) one or more braking control instructions, (c) one or more steering control instructions, and (d) one or more jack control instructions that, when executed, causes the n-dimensional position of the coupler to align with the vertex of the alignment traveling boundary signal.

In some embodiments, the set of automated tethering instructions further include: (3) a third subset of automated tethering instructions that, when executed, causes the coupler of the AEP trailer to physically connect the coupler of the AEP trailer to the tethering *nexus*.

In some embodiments, the third subset of automated tethering instructions include one or more jack control instructions that, when executed, causes a movement of the coupler of the AEP trailer from a pre-determined tether connection point to the n-dimensional position of the tethering *nexus*.

In some embodiments, the AEP trailer comprises a plurality of motors and a plurality of wheels, each motor of the AEP trailer operatively controls a distinct wheel of the AEP trailer, and computing the set of automated tethering instructions includes computing a distinct set of automated tethering instructions for each distinct motor of the AEP trailer.

In some embodiments, the AEP trailer comprises one or more wheel pairs, each distinct wheel pair is controlled by a distinct motor of the AEP trailer, and the set of automated tethering instructions define a target voltage (or propulsion) for the distinct motor associated with each distinct wheel pair.

In some embodiments, the AEP trailer is an un-tethered state when the coupler of the AEP trailer is not physically connected to the tethering *nexus*, the AEP trailer moves from the un-tethered state to a tethering state when the one or more computers are executing the set of automated tethering instructions, and the AEP trailer moves from the tethering state to a tethered state when the coupler of the AEP trailer is physically connected to the tethering *nexus*.

In some embodiments, the method further comprises terminating or pausing the autonomous tethering of the coupler of the AEP trailer to the tethering *nexus* based on detecting a potential collision with an object.

In some embodiments, autonomously tethering the coupler of the AEP trailer to the tethering *nexus* includes one or more feedback loops, the one or more feedback loops continuously perform autonomous tethering computations until (a) the coupler of the AEP trailer is physically connected to the tethering *nexus* or (b) a stopping condition is satisfied, and the one or more feedback loops include: (i) the identifying the n-dimensional position of the tethering *nexus*, (ii) the computing the set of automated tethering instructions, and (iii) the executing the set of automated tethering instructions.

In some embodiments, identifying the target tethering partner includes: computing, via the one or more computers, one or more likely tethering partners; surfacing, via the one or more computers, the one or more likely tethering partners to a user; and selecting, via the one or more computers, one of the one or more likely tethering partners as the target tethering partner based on a user confirmation input.

In some embodiments, the target tethering partner is automatically selected by the AEP trailer, and automatically selecting the target tethering partner includes: (a) detecting, via the one or more computers, a potential tethering partner for the AEP trailer; (b) computing, via the one or more computers, a distance between the potential tethering partner and the AEP trailer; and (c) selecting the potential tethering partner as the target tethering partner if the distance satisfies a tethering proximity threshold.

In some embodiments, the target tethering partner is selected by a user, and selecting the target tethering partner includes: (i) receiving, via the one or more computers, one or more inputs identifying a target tethering object; and (ii) selecting, via the one or more computers, the target tethering object as the target tethering partner for the AEP trailer.

In some embodiments, the method further comprises: detecting, via the one or more computers, a current state of alignment between the AEP trailer and the tethering *nexus*, wherein detecting the current state of alignment between the AEP trailer and the tethering *nexus* includes: (1) capturing, via one or more cameras, an image of a scene containing the AEP trailer and the target tethering partner; (2) detecting, via a machine learning object detection model, the coupler of the AEP trailer and the tethering *nexus* based on model input comprising the image; (3) deriving, via the one or more computers, an n-dimensional position of the coupler of the AEP trailer and an n-dimensional position of the tethering *nexus* based on the detecting; and (4) computing, via the one or more computers, the current state of alignment between the AEP trailer and the tethering *nexus* based on an assessment of the n-dimensional position of the AEP trailer against the n-dimensional position of the tethering *nexus*.

In some embodiments, a method for implementing an automated tethering of an autonomous electric powered trailer to a tethering partner, the method comprising: identifying, via one or more computers, a target tethering partner for an autonomous electric powered (AEP) trailer; identifying, by the AEP trailer, a likely n-dimensional position of a tethering *nexus* of the target tethering partner based on an assessment of sensor data; computing, via the one or more computers, a set of automated tethering instructions based on the identifying the likely n-dimensional position of the tethering *nexus*, wherein the automated tethering instructions, when executed, cause the AEP trailer to: (1) autonomously maneuver into a state of alignment with the tethering *nexus* of the target tethering partner; and (2) autonomously maneuver into a target coupler-to-tether arrangement that arranges a coupler of the AEP trailer adjacent to the n-dimensional position of the tethering *nexus*; and autonomously tethering, via the one or more computers, the coupler of the AEP trailer to the tethering *nexus* based on executing the set of automated tethering instructions.

In some embodiments, the target coupler-to-tether arrangement is achieved when the coupler of the AEP trailer is located at a pre-determined tether connection point associated with the tethering *nexus*, and the set of automated tethering instructions include at least one of: (a) one or more motor control instructions, (b) one or more steering control instructions, (c) one or more brake control instructions, and (d) one or more jack control instructions for moving the coupler of the AEP trailer to the pre-determined tether connection point.

In some embodiments, identifying the likely n-dimensional position of the tethering *nexus* includes computing, via the one or more computers, a likely X-position, Y-position, or Z-position of the tethering *nexus*, and the AEP trailer and tethering *nexus* are determined to be in the state of alignment when an X-position, Y-position, or Z-position of the AEP trailer aligns with the likely X-position, Y-position, or Z-position of the tethering *nexus*.

In some embodiments, a method for autonomously tethering an autonomous electric powered trailer to a tethering partner includes: identifying, via one or more computers, a target tethering partner for an autonomous electric powered (AEP) trailer, wherein the target tethering partner comprises a tethering *nexus*; detecting, via the one or more computers, a likely n-dimensional position of the tethering *nexus* based on an assessment of sensor data; computing, via the one or more computers, a set of automated tethering instructions based on the likely n-dimensional position of the tethering *nexus*; and autonomously tethering, via the one or more computers, a coupler of the AEP trailer to the tethering *nexus* based on executing the set of automated tethering instructions, wherein autonomously tethering the coupler of the AEP trailer to the tethering *nexus* includes autonomously connecting the coupler of the AEP trailer to the tethering *nexus* of the target tethering partner.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the invention(s) is not intended to limit the invention(s) to these preferred embodiments, but rather to enable any person skilled in the art to make and use the invention(s).

1. Autonomous Electric-Powered Trailer System

Figure 1:
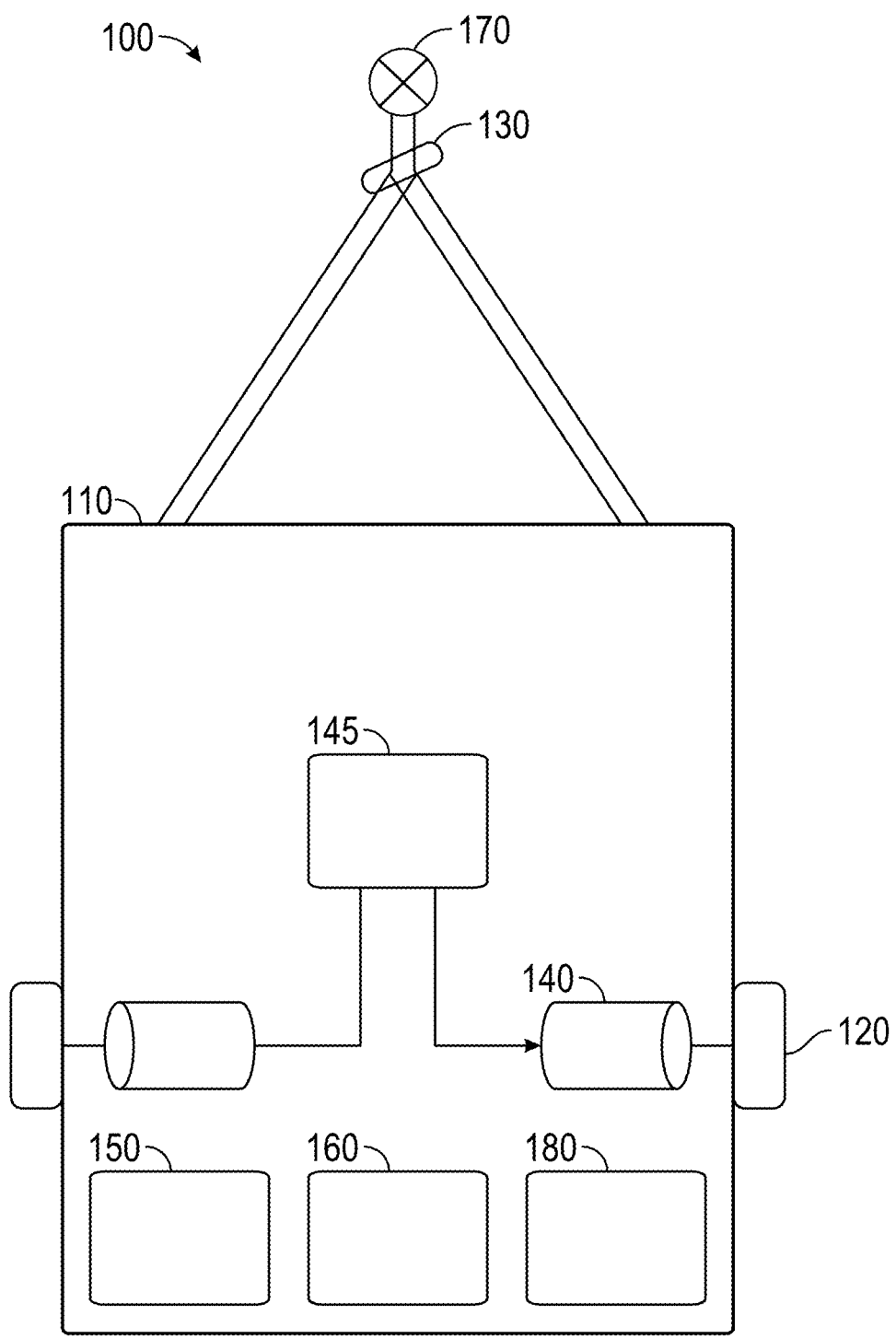
FIG. 1 illustrates a schematic representation of a system 100 in accordance with one or more embodiments of the present application.

As shown by reference to FIG. 1, an autonomous electric-powered trailer system 100 for assistive driving transport with a tow entity (e.g., a tow vehicle) and, in some circumstances, while detached from a tow entity, autonomous transport or movement may include a chassis 110 of an AEP trailer system 100, a plurality of wheels 120 (motorized/unmotorized), a steerable axle/caster wheel 130, one or more electric motors 140 powered by a battery subsystem 145, sensor suite 150, an autonomous trailer control subsystem 160, a coupler (e.g., tow vehicle hitch receiver) 170, and a communication subsystem 180. Additionally, as shown in FIGS. 4A-4C, 5A-5C and 6, AEP trailer system 100 may include a coupling sensor system 190.

The autonomous electric-powered trailer system 100 may preferably be implemented in conjunction with a tow vehicle or the like having an independent propulsion system. In a tethered driving operation, an autonomous driving behavior of the AEP trailer system 100 may be responsive to and/or informed by an initial driving behavior of the tow vehicle. In such cases, the one or more sensing devices 150 and/or coupling sensor system 190 of the AEP trailer system 100 may operate to identify driving activity and/or operations of a tow vehicle tethered to the AEP trailer system 100 and responsively computer autonomous movement and/or driving control instructions for the AEP trailer system 100.

1.10 Trailer Chassis

The chassis 110 of the AEP trailer system 100 preferably comprises a load-bearing framework of an artificial object that preferably structurally supports the artificial object in its construction and function. That is, in some embodiments, the chassis 110 may be an undercarriage used to transport a load or container (e.g., trailer enclosure, trailer housing, cargo box, tank, trailer body, etc.) over the road. In one or more embodiments, the chassis 110 may include a frame having a composition of one or more materials, which may include a combination of metals (e.g., steel) and/or wood-based components. The chassis 110 preferably additionally includes one or more axles that support the attachment of the plurality of wheels 120 and the caster wheel 130, a trailer tongue (e.g., hitching assembly) or the like that extends from a main body of the chassis, a coupler arranged at a distal end of the trailer tongue (e.g., hitching assembly), a cranking or jacking mechanism arranged along the trailer tongue.

It shall be noted that the term "trailer tongue," in some portions of the disclosure, may interchangeably be referred to as a "hitching assembly." Thus, in some embodiments, the hitching assembly may correspond to or include one or more structural and mechanical components such as a coupler, drawbar, tow bar, jack or cranking mechanism, safety chains, electrical connectors, and/or other coupling hardware (e.g., a tethering sensor) configured to enable secure attachment to a towing vehicle and support towing operations.

1.20 Wheels

The plurality of wheels 120 of the AEP trailer system 100 are preferably attached to the one or more axles of the chassis 110. In some embodiments, the plurality of wheels 120 may be powered by and/or include the one or more motors 140 and may include a braking system. The braking system, as generally referred to herein, may implement any suitable technique for slowing or stopping the AEP trailer system 100 including, but not limited to, hydraulic braking systems, electric braking systems, regenerative braking systems, disk-based brake systems, drum-based brake systems, or the like.

In a first implementation, each of the plurality of wheels 120 or a subset of the plurality of wheels 120 may include or may be powered at least one motor of the one or more motors 140. In this first implementation, the at least one motor of a given wheel may be independently powered and operated to enable an independent movement of the given wheel. While the at least one motor may enable an independent operation of the given wheel, it shall be recognized that each motor of each wheel may be operated in coordination or in concert to enable various driving operations of the AEP trailer system 100.

In a second implementation, each pair (i.e., left wheel/right wheel defining a pair) of the plurality of wheels 120 may be powered by a single motor of the one or more motors 140. In such embodiments, the single motor may be arranged along an axle onto which each distinct wheel of the pair of wheels may be arranged at each respective end of the axle. In this second implementation, the pair of wheels may be operated in a coordination based on an operation of the single motor.

It shall be recognized that in some embodiments, the AEP trailer system 100 may include a plurality of axles in which only a subset of the plurality of axles includes the one or more motors 140.

1.30 Steerable Axle|Caster Wheel

The steerable axle 130 preferably functions to support or enable directional movements of the AEP trailer system 100. In one or more embodiments, the steerable axle 130 includes a caster wheel. In one implementation, the steerable axle 130 may be powered by an independent motor of the one or more motors 140 arranged along the steerable axle 130 to rotate the caster wheel. In another implementation, the steerable axle 130 may be passive and a movement of the caster wheel may be encouraged by a movement of one or more of the plurality of wheels 120 when powered by the one or more motors 140.

Additionally, or alternatively, the steerable axle 130 may include a cranking or jacking mechanism (not shown) that operates to lift and lower the steerable axle 130. In one or more embodiments, the cranking or jacking mechanism may be electric-powered and an operation thereof automated and/or controlled by the AEP trailer system 100. In a non-limiting example, the cranking or jacking mechanism may be operated during one or more automated tethering or automated hitching operations in which the AEP trailer system 100 operates to automatically hitch its coupler to a tow hitch or tethering mechanism of a tow entity. In some embodiments, the jacking mechanism may enable or semi-manual (e.g., external electronic jacking interface of the AEP trailer) or manual intervention (e.g., a manual crank) for lifting and/or lowering a coupler of the AEP trailer system 100 to a tethering mechanism.

1.40 Electric Motors

The one or more electric motors 140 of the AEP trailer system 100 preferably function to produce torque for turning one or more of the plurality of wheels 120, the steerable axle 130, and/or the jacking mechanism of the AEP trailer system 100. In one or more embodiments, the one or more electric motors 140 may be powered by energy outputs of the battery subsystem 145 to generate the torque outputs for operating one or more mechanisms (e.g., wheels, jack, etc.) of the AEP trailer system 100.

As mentioned above, the one or more motors 140 in varying embodiments may be arranged along the chassis 110 and/or the plurality of wheels 120 in any suitable manner for achieving a steering and driving of the AEP trailer system 100. In one implementation, the one or more motors 140 may be arranged along an axle shared between pairs of wheels. In another implementation, the one or more motors 140 may be arranged on distinct, independent axles that uniquely power each respective wheel of the plurality of wheels 120. In a further implementation, a combination of the aforementioned implementations may be combined to optimize driving and/or steering operations of the AEP trailer system 100.

Moreover, in yet another implementation, the one or more motors 140 may be coupled to an active differential module or system. In this implementation, the active differential module or system may actively (and selectively) direct torque generated by the one or more motors 140 to one or more of the plurality of wheels 120. For instance, in a non-limiting example, the active differential module or system may control which of the plurality of wheels 120 receive the torque generated by the one or more motors 140 and which of the plurality of wheels 120 do not receive the torque generated by the one or more motors 140.

1.45 Battery Subsystem

The battery subsystem 145 is preferably in electrical communication with each of the electric-powered components of the AEP trailer system 100 and may function to provide energy outputs to the electric-powered components based on control signals from the autonomous trailer control subsystem 160.

Additionally, or alternatively, the battery subsystem 145 may include a battery stack that may include a plurality of distinct batteries or energy storage devices. In one or more embodiments, the battery stack may include a plurality of distinct batteries in which subsets of one or more batteries may be dedicated to a distinct electric-powered component of the AEP trailer system 100. In this way, power consumption of various electronic components of the AEP trailer system 100 and/or the over consumption of the electric-powered components may be intelligently managed to increase safety and/or efficiency of the AEP trailer system 100.

1.50 Sensing Devices

The sensor suite 150 preferably functions to observe and/or collect data (e.g., sensor data) from one or more components of the AEP trailer system 100, an environment and/or circumstances surrounding the AEP trailer system 100 and/or a tow entity, a coupler component and/or coupled subsystem, and/or the like. According, in one or more embodiments, the sensor suite 150 may function to periodically and/or continuously measure a behavior of static and dynamic objects in an environment of the AEP trailer system 100, a behavior of a tow entity (in either a tethered or untethered state) and measure self-behavior.

In a preferred embodiment, the sensor suite (e.g., computer vision system, LIDAR, RADAR, ultrasonic sensors, wheel speed sensors, IMU, GPS, cameras, etc.) 150 or onboard sensors that are in operable communication with the autonomous trailer control subsystem 160.

The sensor suite 150 preferably includes sensors used to perform autonomous trailer operations (such as automated tethering, autonomous driving, and/or the like) and data capture regarding the circumstances surrounding the AEP trailer system 100 as well as data capture relating to operations of the AEP trailer system 100 but may additionally or alternatively include sensors dedicated to detecting maintenance needs of the AEP trailer system 100. For example, the sensor suite 150 may include motor feedback and/or diagnostic sensors or an exterior pressure sensor strip. As another example, the sensor suite 150 may include sensors dedicated to identifying a position of a tethering *nexus* (e.g., a tow hitch or the like) relative to a position of the AEP trailer system 100.

1.60 Autonomous Trailer Control Subsystem

The AEP trailer system 100 preferably includes an autonomous trailer control subsystem 160 (e.g., an onboard computer operably integrated with the AEP trailer) but can additionally or alternatively be decoupled (e.g., not onboard) from the AEP trailer system 100 (e.g., a user mobile device operating independent of the autonomous trailer). That is, in one or more embodiments, parts of the autonomous trailer control subsystem 160 may be operated and/or performed remotely by one or more external computing systems (e.g., a mobile user device, remote cloud computing system) that be may in operable control communication (e.g., via a network, short-range communication system, and the like).

Additionally, or alternatively, the autonomous trailer control subsystem 160 may include a processing system (e.g., graphical processing unit or GPU, central processing unit or CPU, or any suitable processing circuitry) as well as memory and a sensor fusion system. The memory can be short term (e.g., volatile, non-volatile, random-access memory or RAM, etc.) and/or long term (e.g., flash memory, hard disk, etc.) memory.

In one or more embodiments, the sensor data fusion system may function to synthesize and process sensor data for deriving to artifacts (e.g., load measurements, tow vehicle acceleration/braking, and the like), predicting the presence, location, classification, and/or path of objects and features of the environment of the AEP trailer system 100. In various embodiments, the sensor data fusion system may function to incorporate data from multiple sensors and/or data sources, including but not limited to cameras, LIDARS, radars, remote data feeds (Internet-based data feeds, weather feeds, and the like), and/or any number of other types of sensors.

As discussed below, the AEP trailer system 100 may additionally include a trailer communication interface 170 that includes a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, trailer pin connectors (e.g., 4 pin, 7 pin, or the like), or any other suitable wired data communication system or protocol), sensors, and/or a data transfer bus (e.g., CAN, FlexRay). In a preferred embodiment, the autonomous trailer control subsystem 160 may operate to interact with and/or operably control any or one or more of the identified components or modules described herein.

Additionally, or alternatively, the AEP trailer system 100 may be in operable communication with a remote or disparate computing system that may include a user device (e.g., a mobile phone, a laptop, etc.), a remote server, a cloud server, or any other suitable local and/or distributed computing system remote from the AEP trailer system 100. The remote computing system may preferably be connected to one or more systems of the autonomous trailer through one or more data connections (e.g., channels), but can alternatively communicate with the AEP trailer system in any suitable manner.

The autonomous trailer control subsystem 160 preferably functions to control the AEP trailer system 100 and process sensed data from a sensor suite (e.g., a computer vision system, LIDAR, flash LIDAR, wheel speed sensors, GPS, etc.) of the AEP trailer system 100 (such as sensor suite 150), coupling sensor system 190, and/or other sensors to determine states of the AEP trailer system 100 and/or states of agents in an operating environment of the AEP trailer system 100. Based upon the states of the autonomous trailer and/or agents in the operating environment and programmed instructions, the autonomous trailer control subsystem 160 preferably modifies or controls behavior of AEP trailer system 100.

The autonomous trailer control subsystem 160 is preferably a general-purpose computer adapted for I/O communication with AEP trailer control systems and sensor systems but may additionally or alternatively be any suitable computing device.

Additionally, or alternatively, the autonomous trailer control subsystem 160 is preferably connected to the Internet via a wireless connection (e.g., via a cellular link or connection). Additionally, or alternatively, the autonomous trailer control subsystem 160 may be coupled to any number of wireless or wired communication systems.

The positioning system processes sensor data along with other data to determine a position (e.g., a local position relative to a map, an exact position relative to lane of a road, AEP trailer heading, velocity, etc.) of the AEP trailer system 100 relative to the environment. The guidance system processes sensor data along with other data to determine a path for the AEP trailer system 100 to follow.

In various embodiments, the controller may function to implement machine learning techniques to assist the functionality of the controller, such as feature detection/classification, obstruction mitigation, route traversal, mapping, sensor integration, ground-truth determination, and the like.

Additionally, or alternatively, in some embodiments, the autonomous trailer control subsystem may include a vision perception system or module that include extensible machine learning-based objection classification sub-modules trained for predicting and/or classifying varying areas (e.g., a rear) of a tow entity, a position of tethering *nexus*, and/or the like.

Additionally, or alternatively, the vision perception system or module may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an a priori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, Mobile-BERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the AEP trailer system 100. Further, any suitable model (e.g., machine learning, non-machine learning, etc.) may be implemented in the various systems and/or methods described herein.

1.70 Coupler

Coupler 170 preferably functions to couple the AEP trailer to a tethering *nexus* (e.g., a tow hitch on a tow vehicle). In one or more embodiments, coupler 170 may include a locking mechanism for locking and/or securing the AEP trailer to the tow vehicle and/or the tethering *nexus*. In some embodiments, coupler 170 may include a receiver mechanism with a shape complementary to the shape of a coupler on a tow vehicle and/or a tethering *nexus*. As a non-limiting example, in some embodiments a tethering *nexus* may comprise a hitch ball, and coupler 170 may comprise a ball coupler shaped to receive the hitch ball of the tethering *nexus*. It shall be noted that the above example is non-limiting, and coupler 170 may comprise any suitable shape, size, and/or type of trailer coupler.

1.80 Trailer-to-Tow Entity Communication Interface

The trailer communication interface 170 preferably enables the AEP trailer system 100 to communicate and/or exchange data with systems, networks, and/or devices external to and/or that may be independent of the AEP trailer system 100. Preferably, the trailer communication interface 170 enables one or more entity devices and/or user devices/applications to communicate directly with the AEP trailer system 100. The trailer communication interface 170 preferably includes one or more of a cellular system (or any suitable long-range communication system), direct shortwave radio, or any other suitable short-range communication system.

1.90 Coupling Sensor System

In one or more embodiments, autonomous electric-powered trailer system 100 may include coupling sensor system 190. Coupling sensor system 190 may preferably function to collect data related to one or more coupling or tethering operations of the AEP trailer system 100. In some embodiments, coupling sensor system 190 may include one or more sensors dedicated to identifying or detecting a tethering *nexus* (e.g., a tow hitch or the like of a tow vehicle) and/or monitoring a position of a tethering *nexus* (e.g., a tow hitch or the like) relative to a position of the AEP trailer system 100. In some preferred embodiments, coupling sensor system 190 may include one or more coupling sensors arranged in one or more locations on autonomous electric-powered trailer system 100. The one or more coupling sensors, in some embodiments, may be configured to sense in a direction toward a tethering *nexus* of a tow vehicle. Additionally, in some embodiments, coupling sensor system 190 may function as a subsystem of sensing suite 150. In one or more embodiments, coupling sensor system 190 may be in operable communication with autonomous trailer control subsystem 160 (e.g., a processing unit or the like that uses sensing data sensed by a tethering or coupling sensor to autonomously control a physical tethering of a hitching assembly of the autonomous electric-powered trailer to a tethering *nexus* of a tow vehicle).

In various embodiments, coupling sensor(s) of coupling sensor system 190 may preferably function to obtain or collect data (e.g., sensor data) related to a coupler (hitching) component or subsystem of the autonomous electric-powered trailer (e.g., coupler 170). In some embodiments, the one or more coupling sensors may function to periodically and/or continuously measure a coupler component, coupler subsystem, and/or a coupling state or status of the autonomous electric-powered trailer (as described herein in section 2). In some embodiments, the one or more coupling sensors may additionally or alternatively function to periodically and/or continuously monitor a coupler and/or a coupler subsystem of a tow vehicle (e.g., a tethering *nexus*, as also described herein in section 2), in a tethered and/or an untethered state of the AEP trailer. Accordingly, coupling sensor system 190 may function to collect data to enable a guidance of an automated coupling or tethering operation of the AEP trailer to a tethering *nexus* (e.g., as described herein in section 2). Additionally, coupling sensor system 190 may function to collect data to confirm, monitor, and/or verify whether the AEP trailer is tethered or untethered (coupled or uncoupled) to a tethering *nexus* (e.g., a tow hitch on a tow vehicle).

In various embodiments, the one or more coupling sensors of coupling sensor system 190 may include one or more image sensors (e.g., one or more cameras), one or more LIDAR sensors, one or more RADAR sensors, one or more ultrasonic sensors, one or more computer visions systems, and/or any other suitable sensor or sensing system for detecting a coupler or coupling status of the autonomous electric-powered trailer or a tow vehicle. It shall be noted that the term "coupling sensor(s)," in some portions of the disclosure, may be interchangeably referred to as "sensors," "tethering sensors," and/or the like.

In some embodiments, as shown by way of example in FIGS. 4A-4C and 5A-5C, coupling sensor system 190 may be configured with one or more coupling sensors (e.g., tethering sensors) arranged on or adjacent to frame 192 (e.g., chassis 110) of the AEP trailer system 100. Additionally, or alternatively, the one or more coupling sensors may be coupled to or arranged on a hitching assembly or trailer tongue of the autonomous electric-powered trailer system 100. In one or more embodiments, frame 192 may comprise a structural support for one or more components of the AEP trailer system. In some embodiments, frame 192 may comprise an A-frame that may include diagonal beams converging to a point (as shown by way of example in FIGS. 4A-4C).

In some embodiments, as shown by way of example in FIGS. 4A-4C and 5A-5C, coupling sensor system 190 may be configured with one or more coupling sensors arranged on or adjacent to a forward housing of the AEP trailer system 100. In one or more embodiments, the forward housing of the AEP trailer system 100 may be supported by frame 192. In some embodiments, the forward housing may comprise an aerodynamic enhancement apparatus as described in U.S. Pat. No. 11,964,705, titled EXPANDABLE AERODYNAMIC ENHANCEMENT APPARATUS FOR TRAILERS, which is incorporated in its entirety by this reference.

In some embodiments, as shown by way of example in FIGS. 4A-4C and 5A-5C, coupling sensor system 190 may be configured with one or more coupling sensors arranged on or adjacent to a trailer housing (sometimes referred to herein as a "trailer body") of the AEP trailer system 100. In various embodiments, the trailer housing of the AEP trailer system 100 may function to house or enclose one or more components of the AEP trailer system 100. In one or more embodiments, the trailer housing of the AEP trailer system 100 may be supported by chassis 110.

Figure 5A:
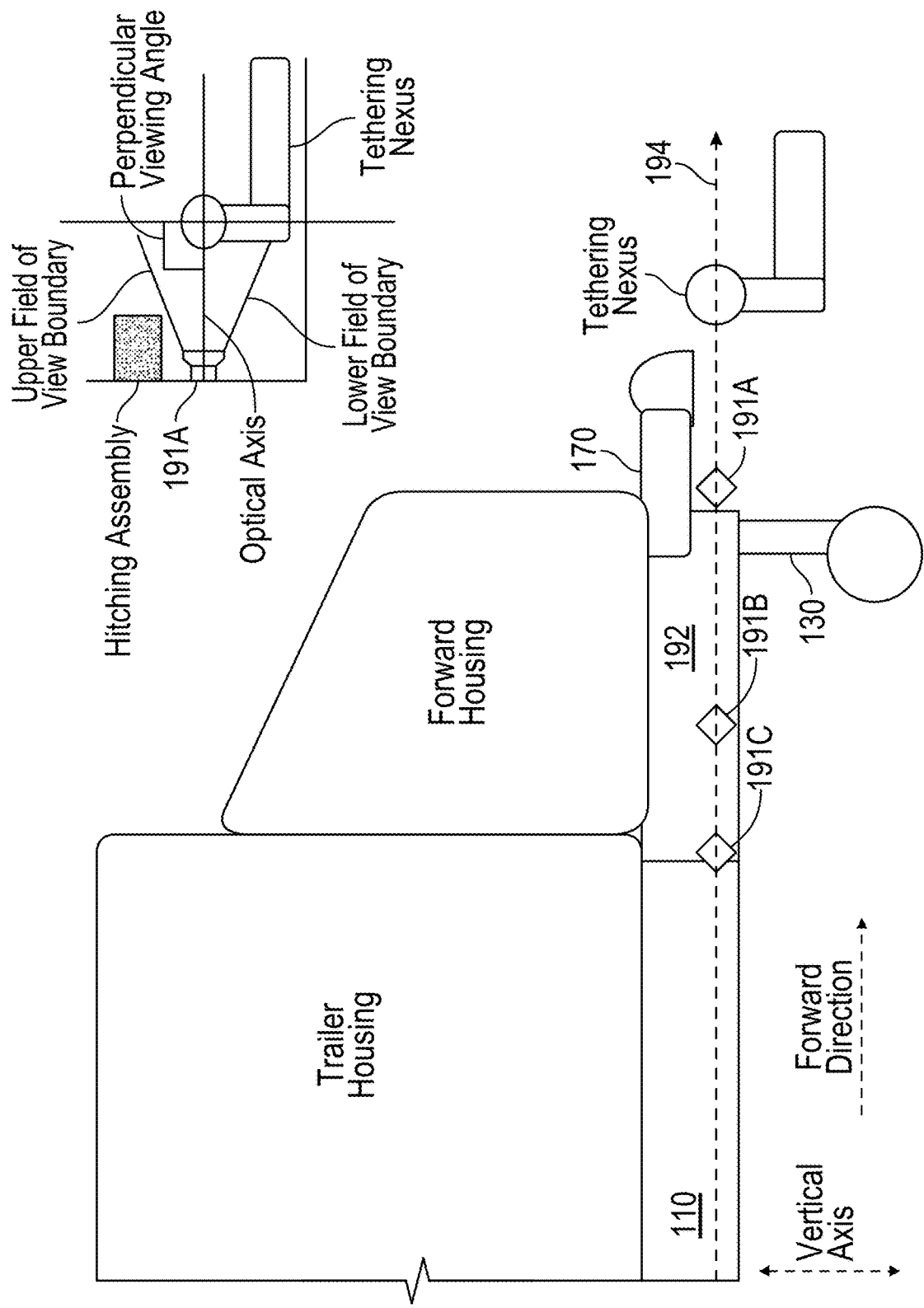
FIGS. 5A-5C illustrate example side-view schematic representation of coupling sensor arrangements in accordance with one or more embodiments of the present application.

In some preferred embodiments, coupling sensor system 190 may include one or more coupling sensors located in plane 194, as shown by way of example in FIG. 5A (e.g., coupling sensors 191A, 191B, and 191C). In such preferred embodiments, plane 194 may comprise a horizontal plane in the frame of reference of the AEP trailer, orthogonal to a vertical axis of the frame of reference of the AEP trailer. Additionally, in such preferred embodiments, plane 194 may intersect a tethering *nexus* (e.g., during a tethering or coupling operation of the AEP trailer), such that the one or more coupling sensors in plane 194 may be coplanar with the tethering *nexus* once the tethering *nexus* is connected to coupler 170. In such preferred embodiments, the one or more coupling sensors located in plane 194 may advantageously have a direct line of sight to coupler 170, a tethering *nexus*, and/or a connection or tethering point at which coupler 170 and the tethering *nexus* may connect during tethering or untethering operations of the AEP trailer. Such an arrangement may enhance the ability of the AEP trailer to identify and track the tethering *nexus* during autonomous tethering (and untethering) operations, as well allowing for confirmation and periodic or continuous monitoring of the connection status between coupler 170 and a tethering *nexus*. In some embodiments, plane 194 may intersect frame 192 and/or chassis 110. In one or more preferred embodiments, coupling sensor system 190 may comprise one or more coupling sensors arranged at any point on plane 194.

In some embodiments, coupling sensor system 190 may comprise a plurality of coupling sensors. In such embodiments, utilizing a plurality of coupling sensors may advantageously provide a broader sensing area or field of view, redundancy in the event of failure of one or more coupling sensors, and better object detection, tracking, and/or classification. Additionally, in some embodiments, coupling sensor system 190 may comprise a plurality of coupling sensors in stereo arrangements (e.g., coupling sensors 191B, 191C, 191D, 191E, 191G, or 191H in FIGS. 4A-4C and 5A-5C), which may additionally provide the benefit of enhancing the depth perception and accuracy of coupling sensor system 190.

1.95 Coupling Sensor Arrangements

As shown in FIGS. 4A-4C and 5A-5C, coupling sensor system 190 may comprise one or more coupling sensors 191A-191I arranged in one or more positions and/or orientations in the AEP trailer system 100. It shall be known that the arrangements of coupling sensors 191A-191I are not mutually exclusive; that is, in some embodiments, coupling sensor system 190 may comprise any combination of one or more coupling sensors 191A-191I. Additionally, in some embodiments, coupling sensor system 190 may comprise only one or more coupling sensors 191A, only one or more coupling sensors 191B, only one or more coupling sensors 191C, only one or more coupling sensors 191D, only one or more coupling sensors 191E, only one or more coupling sensors 191F, only one or more coupling sensors 191G, only one or more coupling sensors 191H, or only one or more coupling sensors 191I. Moreover, it shall be noted that the exemplary arrangements of coupling sensors 191A-191I in FIGS. 4A-4C and 5A-5C are non-limiting, and in some embodiments coupling sensor system 190 may comprise one or more coupling sensors arranged in locations and orientations other than those depicted, as suitable for collecting sensor data on coupling or tethering operations of the AEP trailer system 100.

Coupling Sensor Arrangement A

Figure 4A:
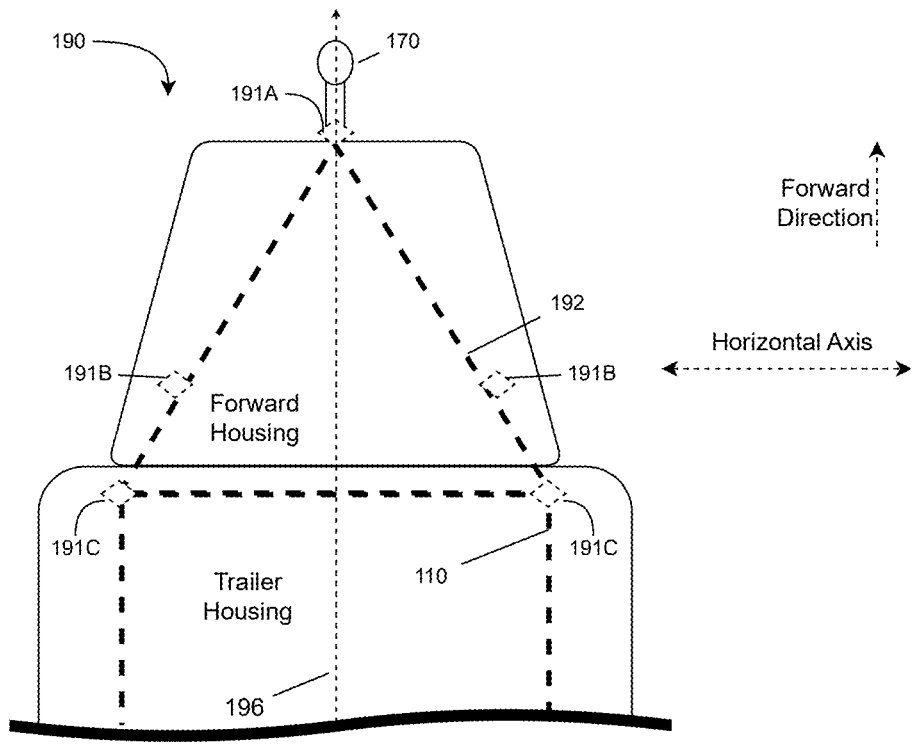
FIGS. 4A-4C illustrate example top-down schematic representations of coupling sensor arrangements in accordance with one or more embodiments of the present application.

In a first example, as shown in FIGS. 4A and 5A, the coupling sensor system 190 may include a coupling sensor 191A. In such an example, coupling sensor 191A may be arranged adjacent to trailer coupler 170. Additionally, in such an example, coupling sensor 191A may be located below trailer coupler 170 in the frame of reference of a vertical axis of the AEP trailer system 100 (e.g., Y-axis of the AEP trailer system 100). As illustrated in the example of FIG. 4A, coupling sensor 191A may be arranged on the central longitudinal axis 196 of the AEP trailer system 100, such that the coupling sensor 191A may be centered horizontally relative to the AEP trailer. Additionally, as shown in FIG. 5A, coupling sensor 191A may preferably be located in plane 194. In one or more embodiments, coupling sensor 191A may be oriented (angled) toward coupler 170, such that a sensing area (e.g., field of view) of coupling sensor 191A may be aimed at coupler 170 to more easily identify, classify, and track the tethering *nexus* and/or tethering or coupling of the tethering *nexus* to coupler 170. It shall be noted that, in some portions of the disclosure, orienting the coupling sensor 191A towards the coupler and/or tethering *nexus* may be referred to as configuring coupling sensor 191A to sense in a direction toward the tethering *nexus* of the tow vehicle.

In such an embodiment, the location of coupling sensor 191A may advantageously ensure optimal performance for identification, classification, and tracking of the tethering *nexus* (e.g., a hitch ball on a tow vehicle). In such an embodiment, coupling sensor 191A may be arranged level with a tethering *nexus* with an unobstructed line of sight from coupling sensor 191A to the tethering *nexus* and coupler 170, as depicted in FIG. 5A. Additionally, in some embodiments, coupling sensor 191A may be arranged perpendicular or substantially perpendicular to the tethering *nexus* (e.g., 45-95 degrees to the plane 194 of the tethering *nexus*, described below).

Thus, in instances where coupling sensor 191A corresponds to or comprises an image sensor, coupling sensor 191A may function to capture one or more images of the tethering *nexus* from a viewing angle perpendicular or substantially perpendicular to the tethering *nexus*. A viewing angle of the coupling sensor, as generally used herein, may be defined as the angle between an optical axis of the image sensor and a plane 194 including the coupling sensor 191A. It shall be noted that the optical axis of the image sensor, as generally used herein, may refer to an imaginary line that extends perpendicularly from a center of a lens of the image sensor and represents a primary direction in which the image sensor captures images.

For example, when the viewing angle of the coupling sensor 191A is perpendicular to the tethering *nexus*, the image(s) captured by the coupling sensor 191A may be a face-on image of the tethering *nexus*. A "face-on" image of the tethering *nexus*, as generally used herein, refers to an image in which the tethering *nexus* (e.g., a hitch ball on a tow vehicle) is viewed directly from the front, such that the primary visible features of the tethering *nexus* are presented without (e.g., significant) perspective distortion. Conversely, when the viewing angle of the coupling sensor 191A is perpendicular or substantially perpendicular to the tethering *nexus* (e.g., slightly offset from 90 degrees but remains within a range of approximately 45-95 degrees to the plane 194 including the tethering *nexus*), the image(s) captured by the coupling sensor 191A may be considered face-on or substantially face-on while including minor angular variations that can aid in depth assessments of the tethering *nexus*.

Additionally, or alternatively, in some embodiments, the optical axis of the image sensor (e.g., coupling sensor 191A) may be perpendicular or substantially perpendicular to the tethering *nexus* (e.g., 45-95 degrees to the plane 194 of the tethering *nexus*). For example, the optical axis of the image sensor may be 40, 50, 60, 70, 75, 80, 85, 90, or 95 degrees relative to the plane 194 of the tethering *nexus*. As indicated herein, in some embodiments, coupling sensor 191A may be arranged or mounted to a bottom of a hitching assembly or tongue of the AEP trailer system 100. Thus, in some embodiments, a field of view of the image sensor may include the tethering *nexus* of the tow vehicle and may not include the coupler (e.g., sometimes referred to as "hitching assembly" in some portions of the disclosure. That is, in some portions of the disclosure describing a trailer tongue and a hitching assembly may be interchangeably referred to as a "hitching assembly" and "trailer coupler," respectively). In other embodiments described herein, the field of view of the image sensor may include both the tethering *nexus* of the tow vehicle and the hitching assembly of the AEP trailer system 100.

Furthermore, in some embodiments, the location of coupling sensor 191A may provide a clear, unobstructed field of view of a connection point at which the tethering *nexus* may be connected to coupler 170 when the AEP trailer is tethered. In such an example, coupling sensor 191A may be arranged at a specific height, as defined by plane 194, with or without a vertical offset under coupler 170 to achieve an optimal vantage point for monitoring the tethering *nexus* and/or trailer coupler 170. Moreover, in such an example, coupling sensor 191A may be adjacent or proximal to coupler 170, ensuring a close sensor range for coupler 170 and the tethering *nexus*. Accordingly, this arrangement may ensure that coupling sensor 191A may maintain a steady, continuous, and unobstructed view of coupler 170 and the tethering *nexus*. Furthermore, in such an embodiment, the alignment of coupling sensor 191A with the central longitudinal axis may ensure it remains directly in line with a forward direction of the AEP trailer. In some embodiments, coupling sensor 191A may be arranged on coupler 170 and/or on frame 192.

Moreover, in some such embodiments, the coupling sensor(s) may be arranged such that a centroid of the coupling sensor is laterally and/or vertically aligned with a centroid of the tethering *nexus* (e.g., hitch ball) when the tethering *nexus* is in a coupled or coupling position relative to coupler 170. As generally used herein, a centroid of a coupling sensor may refer to a geometric center of the sensing assembly or housing, such as the midpoint of a three-dimensional bounding volume of the sensor apparatus. Similarly, the centroid of a tethering *nexus* may refer to a geometric center of the hitch ball, which may correspond to the center of mass or the midpoint of its spherical geometry. Aligning the centroid of the sensor with the centroid of the tethering *nexus* in plane 194 may enhance image symmetry, minimize distortion, and facilitate accurate estimation of relative position and orientation during coupling operations.

In some embodiments, at least a portion of coupling sensor 191A may not be between a minimum and maximum height of the tethering *nexus* (e.g., hitch ball) when the tethering *nexus* of the tow vehicle and the trailer coupler are not physically tethered together. For example, in some embodiments, 1%, 2%, 5%, 10%, 20%, 40%, 80%, 90%, 95%, 99%, 100%, etc. of the volume (e.g., $cm^3$) of the coupling sensor 191A may be below the minimum height of the tethering *nexus* and/or above the maximum height of the tethering *nexus*. As generally used herein, a maximum height of the hitch ball (e.g., tethering *nexus*) may be defined as a perpendicular distance from a ground surface supporting the plurality of wheels of the AEP trailer system 100 to an apex of the hitch ball. Conversely, a minimum height of the hitch ball (e.g., tethering *nexus*) may be defined as a perpendicular distance from the ground surface to a nadir of the hitching ball. It shall be noted that the volume of the coupling sensor 191A may be measured in in cubic centimeters ($cm^3$) or the like and/or represent the three-dimensional space occupied by the coupling sensor 191A, including its housing, optical components, and/or any other elements integrated within the sensor assembly.

It shall also be noted that the apex of the hitch ball may refer to a highest point on the hitch ball when measured perpendicularly to the ground surface. Moreover, the nadir of the hitch ball may refer to the lowest point on the hitch ball-optionally excluding any supporting structures or mounting components below it-when measured perpendicularly to the ground surface.

Moreover, in some embodiments, at least a portion of the coupling sensor 191A may be between the maximum height of the hitch ball and the minimum height of the hitch ball when the hitching assembly is physically tethered to the tethering *nexus* of the tow vehicle. For example, in some embodiments, when the hitching assembly is physically tethered to the tethering *nexus* of the tow vehicle, the coupling sensor 191A may be positioned such that 50% of its volume is between the maximum height (apex) and minimum height (nadir) of the hitch ball, while the remaining 50% extends below the nadir. In another embodiment, the coupling sensor 191A may be positioned so that only 10% of its volume is above the nadir of the hitch ball, with 90% of its volume extending below the nadir. Conversely, in some cases, 100% of the volume of the coupling sensor 191A may be positioned entirely within the height range of the hitch ball.

In some embodiments, a spatial position of coupler sensor 191A relative to a tethering *nexus* of a tow vehicle may be described in terms of its placement between a hitch ball apex plane and a hitch ball nadir plane. A hitch ball apex plane, as generally used herein, may extend tangential to an apex of the hitch ball and parallel to a ground surface that supports a plurality of wheels of the AEP trailer. Conversely, the hitch ball nadir plane may extend tangential to a nadir of the hitch ball and parallel to the ground surface.

For example, in some embodiments, at least a portion of coupling sensor 191A may be positioned between the hitch ball apex plane and the hitch ball nadir plane when the hitching assembly (e.g., trailer coupler) is physically tethered to the tethering *nexus* of the tow vehicle. In a non-limiting example, at least 1%, 5%, 10%, 25%, 50%, 75%, 90%, 100% etc. of the volume of coupling sensor 191A may be positioned between the hitch ball apex plane and the hitch ball nadir plane (e.g., when the hitching assembly is physically tethered or coupled to the tethering *nexus* of the tow vehicle).

As described previously, the AEP trailer system 100 may include a trailer tongue (also referred to as a "hitching assembly" in some portions of the disclosure). The trailer tongue or hitching assembly, as generally used herein, may extend forward from a main body of a chassis or fame of the AEP trailer system 100 and, optionally, may include one or more diagonal beams that extend outward and forward of the chassis of the AEP trailer system 100 toward a central hitching point. Specifically, in some embodiments, a plurality of diagonal beams may extend from opposite sides of the chassis (e.g., left side and right side of the AEP trailer system 100) and converge at the central hitching point, thereby forming an "A-frame." Additionally, the hitching assembly may correspond to or include one or more structural and mechanical components such as a coupler, drawbar, tow bar, jack or cranking mechanism, safety chains, electrical connectors, and/or other coupling hardware (e.g., a tethering sensor) configured to enable secure attachment to a towing vehicle and support towing operations.

In some embodiments, the trailer coupler of the AEP trailer system 100 may be coupled to, mounted to, or positioned at the central hitching point. Additionally, the trailer tongue may include a top portion and a bottom portion. The top portion of the trailer tongue may be further from the ground surface of the AEP trailer than the bottom portion of the trailer tongue. Conversely, the bottom portion of the trailer tongue may be closer to the ground surface of the AEP trailer system 100 than the top portion of the trailer tongue.

In some embodiments, the hitching assembly of the AEP trailer system 100 and the coupling sensor 191A may be arranged on (e.g., mounted to) opposite sides or portions of the AEP trailer system 100. For example, in some embodiments, the hitching assembly may be coupled to the top portion of the trailer tongue (e.g., at the central hitching point). Conversely, the coupling sensor 191A may be coupled to the bottom portion of the trailer tongue.

In some embodiments, the trailer tongue may have a length (e.g., hitching assembly length) that is measured in a front-to-back direction of the autonomous electric-powered trailer system 100. In some such embodiments, the hitching assembly (e.g., trailer coupler) may extend from a starting position to an ending position along the trailer tongue length. The starting position of the hitching assembly may be closer to a back of the autonomous electric-powered trailer than the ending position of the hitching assembly.

Similarly, the coupling sensor 191A may also extend from a sensor starting position to a sensor ending position along the length of the trailer tongue. The sensor starting position, in some embodiments, may be closer to the back of the AEP trailer system 100 than the starting position of the hitching assembly. Additionally, in some embodiments, the ending position of the hitching assembly may be closer to the front of the AEP trailer system 100 than the sensor ending position.

As also described herein, in some embodiments, the AEP trailer system 100 may include a caster wheel coupled to the trailer tongue and/or chassis of the AEP trailer system 100. The caster wheel, in some embodiments, may be further from the front of the AEP trailer system 100 than the hitching assembly and the tethering sensor. Additionally, in some embodiments, the tethering sensor may be positioned on the bottom portion of the trailer tongue adjacent to (e.g., proximal to) to the hitching assembly.

Coupling Sensor Arrangement B

In some embodiments, as shown in FIGS. 4A and 5A, the one or more coupling sensors may include one or more coupling sensors 191B. In such embodiments, coupling sensor(s) 191B may be arranged vertically below the forward housing. In some such embodiments, coupling sensor(s) 191B may be arranged on frame 192. As shown in FIG. 4A, coupling sensor(s) 191B may be located at a horizontal offset greater than zero from central longitudinal axis 196, such that coupling sensor(s) 191B may be off-center horizontally on the AEP trailer. In some such embodiments, coupling sensor(s) 191B may comprise at least two coupling sensors 191B, one arranged with a horizontal offset from central longitudinal axis 196 on a left side of the AEP trailer and one arranged with a same horizontal offset from central longitudinal axis 196 on a right side of the AEP trailer, such that the at least two coupling sensors 191B may be arranged symmetrically relative to one another around central longitudinal axis 196. In some such embodiments, as shown in FIG. 5A, coupling sensor(s) 191B may be located in plane 194 to advantageously ensure an unobstructed line of sight to coupler 170, the tethering *nexus*, and a connection point at which the tethering *nexus* may be connected to coupler 170 when the AEP trailer is tethered. In some embodiments, coupling sensor(s) 191B may be arranged with a vertical offset below the forward housing, where the vertical offset may be greater than or equal to zero. Additionally, in some embodiments, coupling sensor(s) 191B may be oriented (angled) toward coupler 170, such that a sensing area (e.g., field of view) of coupling sensor(s) 191B may be aimed at coupler 170 to more easily identify, classify, and track the tethering *nexus* and/or tethering or coupling of the tethering *nexus* to coupler 170.

Coupling Sensor Arrangement C

In some embodiments, as shown in FIGS. 4A and 5A, the one or more coupling sensors may include one or more coupling sensors 191C. In such embodiments, coupling sensor(s) 191C may be arranged vertically below the trailer housing. In some such embodiments, coupling sensor(s) 191C may be arranged on chassis 110. As shown in FIG. 4A, coupling sensor(s) 191C may be located at a horizontal offset greater than zero from central longitudinal axis 196, such that coupling sensor(s) 191C may be off-center horizontally on the AEP trailer. In some such embodiments, coupling sensor(s) 191C may comprise at least two coupling sensors 191C, one arranged with a horizontal offset from central longitudinal axis 196 on a left side of the AEP trailer and one arranged with a same horizontal offset from central longitudinal axis 196 on a right side of the AEP trailer, such that the at least two coupling sensors 191C may be arranged symmetrically relative to one another around central longitudinal axis 196. In some such embodiments, as shown in FIG. 5A, coupling sensor(s) 191C may be located in plane 194 to advantageously ensure an unobstructed line of sight to coupler 170, the tethering *nexus*, and a connection point at which the tethering *nexus* may be connected to coupler 170 when the AEP trailer is tethered. In some embodiments, coupling sensor(s) 191C may be arranged with a vertical offset below the trailer housing, where the vertical offset may be greater than or equal to zero. Additionally, in some embodiments, coupling sensor(s) 191C may be oriented (angled) toward coupler 170, such that a sensing area (e.g., field of view) of coupling sensor(s) 191C may be aimed at coupler 170 to more easily identify, classify, and track the tethering *nexus* and/or tethering or coupling of the tethering *nexus* to coupler 170.

Coupling Sensor Arrangement D

Figure 4B:
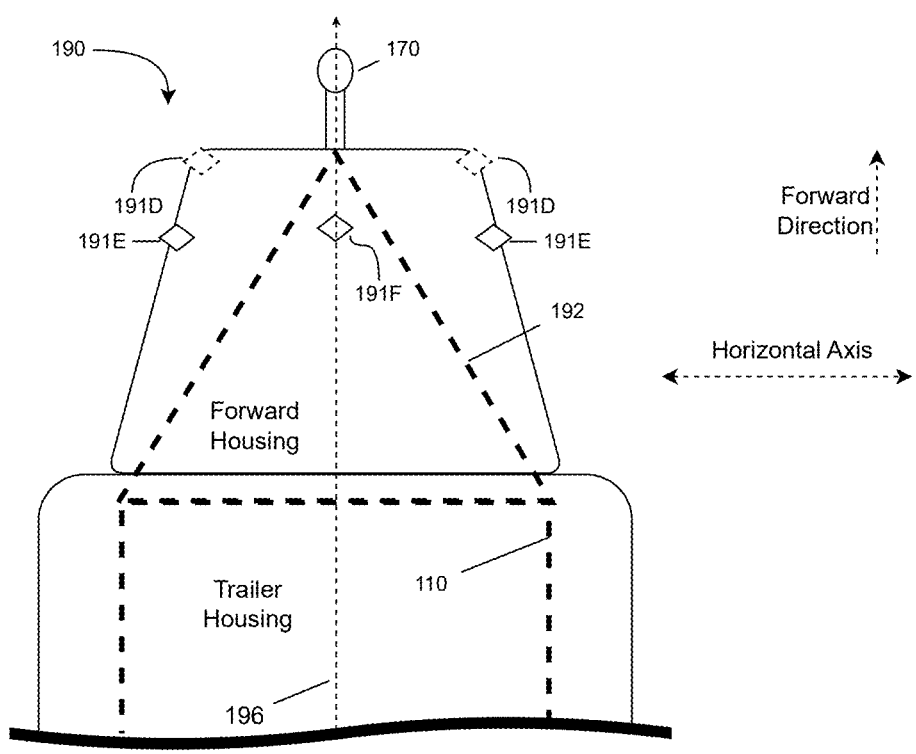
Figure 5B:
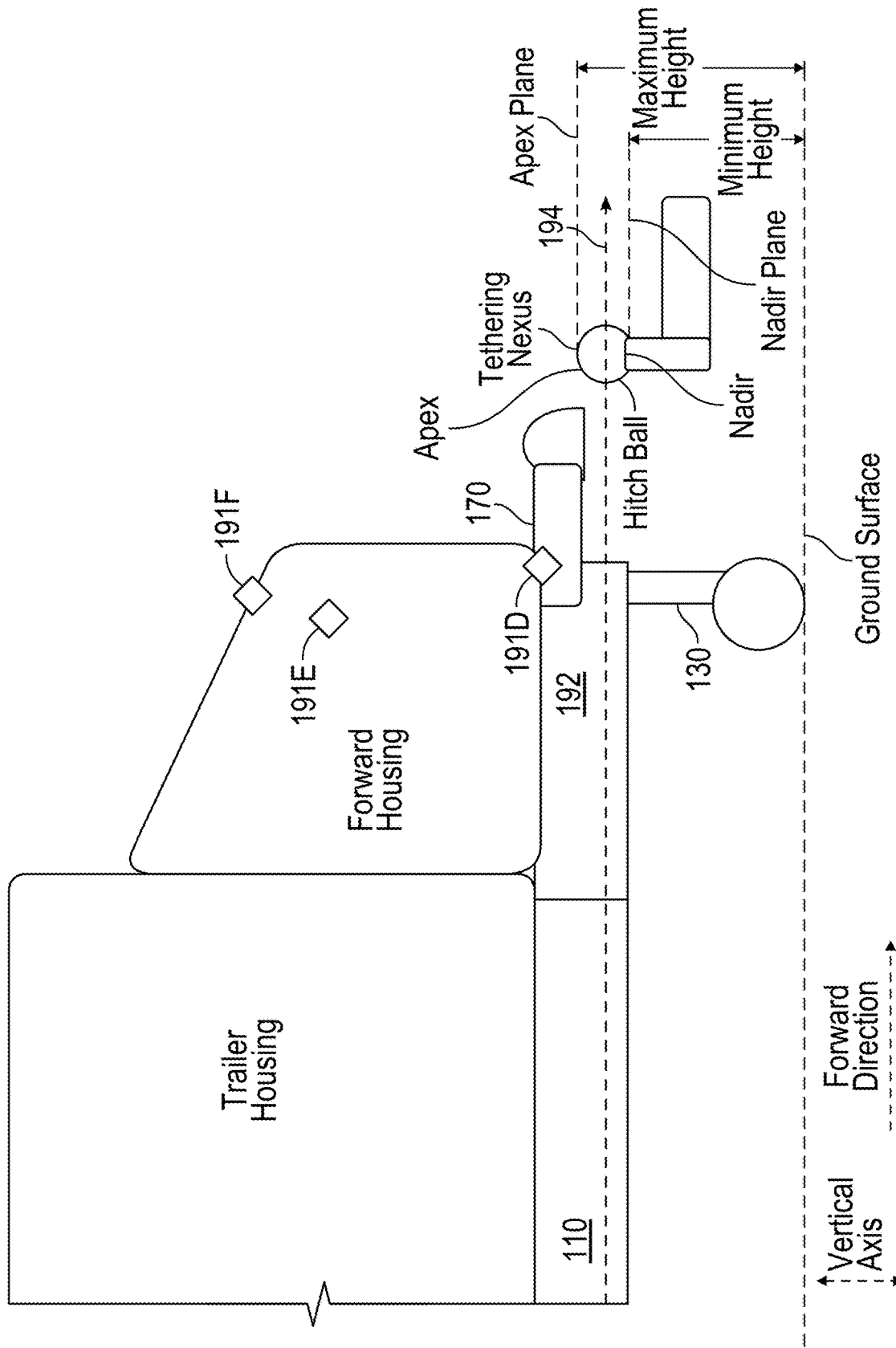

In some embodiments, as shown in FIGS. 4B and 5B, the one or more coupling sensors may include one or more coupling sensors 191D. In such embodiments, coupling sensor(s) 191D may be arranged vertically below the forward housing. In some such embodiments, coupling sensor(s) 191D may be arranged on the frame housing. As shown in FIG. 4B, coupling sensor(s) 191D may be located at a horizontal offset greater than zero relative to central longitudinal axis 196, such that coupling sensor(s) 191D may be off-center horizontally on the AEP trailer. In some such embodiments, coupling sensor(s) 191D may comprise at least two coupling sensors 191D, one arranged with a horizontal offset from central longitudinal axis 196 on a left side of the AEP trailer and one arranged with a same horizontal offset from central longitudinal axis 196 on a right side of the AEP trailer, such that the at least two coupling sensors 191D may be arranged symmetrically relative to one another around central longitudinal axis 196. In some embodiments, as shown in FIG. 5B, coupling sensor(s) 191D may be located with an unobstructed line of sight to coupler 170, the tethering *nexus*, and a connection point at which the tethering *nexus* may be connected to coupler 170 when the AEP trailer is tethered. Additionally, in some embodiments, coupling sensor(s) 191D may be oriented (angled) toward coupler 170, such that a sensing area (e.g., field of view) of coupling sensor(s) 191D may be aimed at coupler 170 to more easily identify, classify, and track the tethering *nexus* and/or tethering or coupling of the tethering *nexus* to coupler 170. In some embodiments, the one or more coupling sensors 191D may be arranged on coupler 170.

Coupling Sensor Arrangements E and F

In some embodiments, as shown in FIGS. 4B and 5B, the one or more coupling sensors may include one or more coupling sensors 191E and/or one or more sensors 191F. In such embodiments, coupling sensor(s) 191E and/or 191F may be arranged on the forward housing (e.g., on an upper surface of the forward housing). As shown in FIG. 4B, coupling sensor(s) 191E may be located at a horizontal offset greater than zero relative to central longitudinal axis 196, such that coupling sensor(s) 191E may be off-center horizontally on the AEP trailer. In some such embodiments, coupling sensor(s) 191E may comprise at least two coupling sensors 191E, one arranged with a horizontal offset from central longitudinal axis 196 on a left side of the AEP trailer and one arranged with a same horizontal offset from central longitudinal axis 196 on a right side of the AEP trailer, such that the at least two coupling sensors 191E may be arranged symmetrically relative to one another around central longitudinal axis 196. Additionally, as shown in FIG. 4B, coupling sensor(s) 191F may be centered on longitudinal axis 196. In some embodiments, as shown in FIGS. 4B and 5B, coupling sensor(s) 191E and/or 191F may be arranged to ensure an unobstructed line of sight to coupler 170, the tethering *nexus*, and a connection point at which the tethering *nexus* may be connected to coupler 170 when the AEP trailer is tethered. Additionally, in some embodiments, coupling sensor(s) 191E and/or 191F may be oriented (angled) toward coupler 170, such that a sensing area (e.g., field of view) of coupling sensor(s) 191E and/or 191F may be aimed at coupler 170 to more easily identify, classify, and track the tethering *nexus* and/or tethering or coupling of the tethering *nexus* to coupler 170.

Coupling Sensor Arrangement G

Figure 4C:
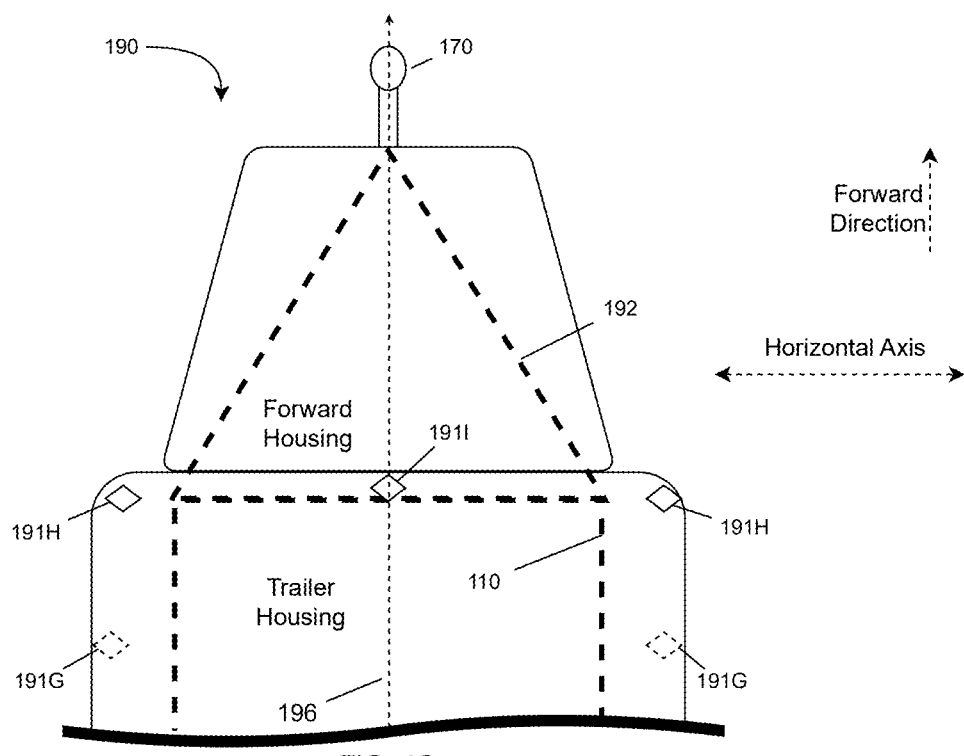
Figure 5C:
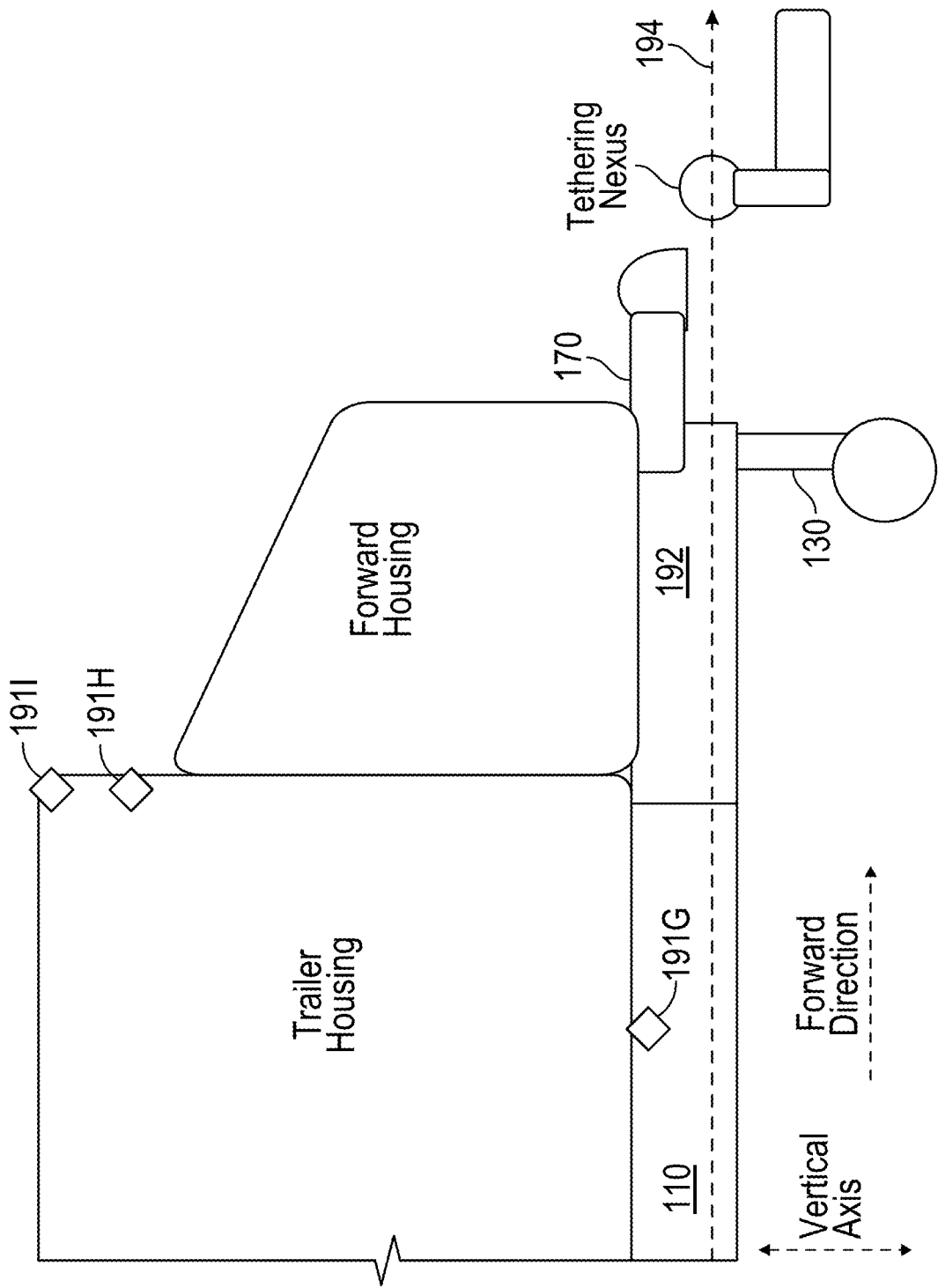
Figure 6:
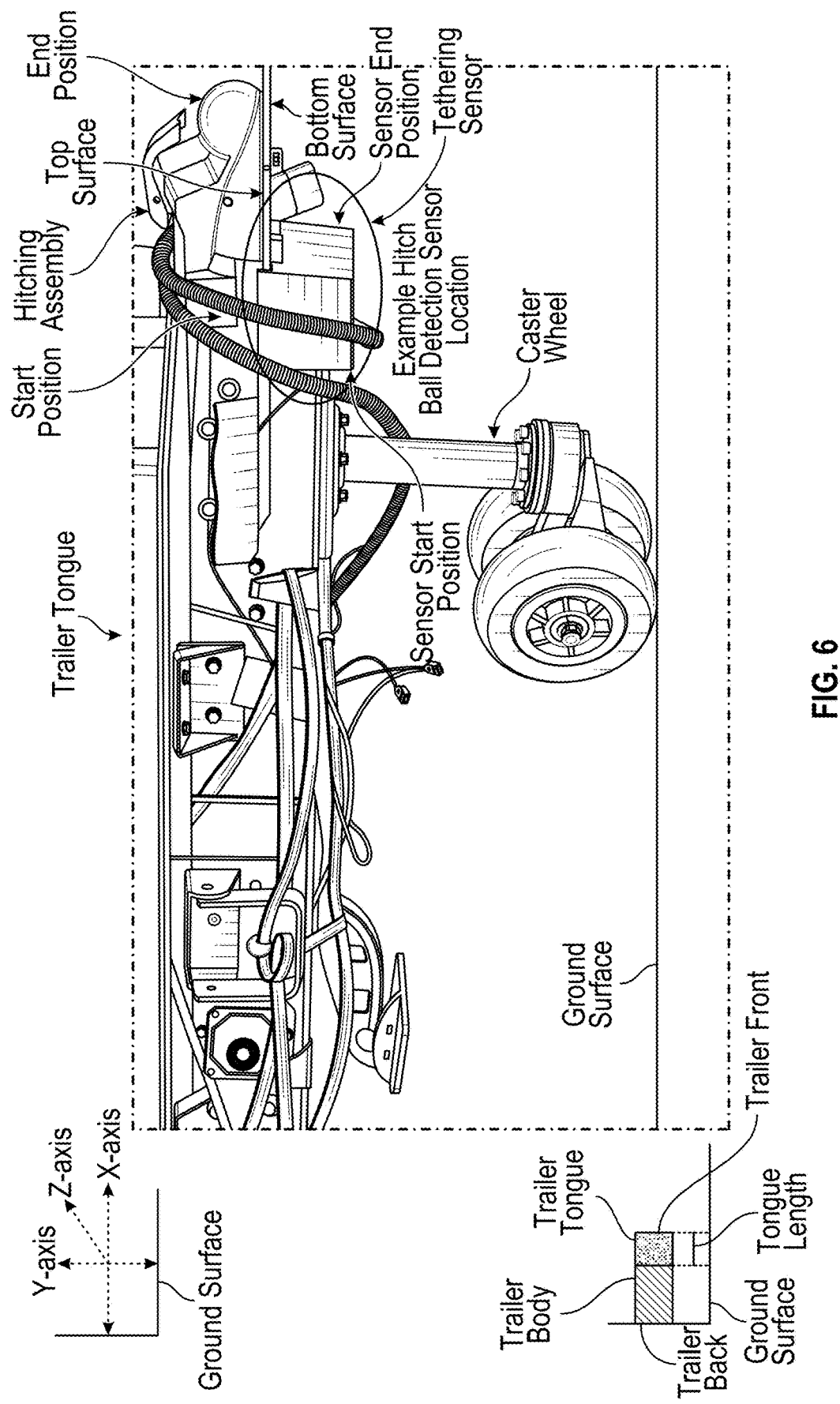
FIG. 6 illustrates another example side-view schematic representation of coupling sensor arrangements in accordance with one or more embodiments of the present application.

In some embodiments, as shown in FIGS. 4C and 5C, the one or more coupling sensors may include one or more coupling sensors 191G. In such embodiments, coupling sensor(s) 191G may be arranged vertically below the trailer housing. In some such embodiments, coupling sensor(s) 191G may be arranged on the trailer housing. As shown in FIG. 4C, coupling sensor(s) 191G may be located at a horizontal offset greater than zero relative to central longitudinal axis 196, such that coupling sensor(s) 191G may be off-center horizontally on the AEP trailer. In some such embodiments, coupling sensor(s) 191G may comprise at least two coupling sensors 191G, one arranged with a horizontal offset from central longitudinal axis 196 on a left side of the AEP trailer and one arranged with a same horizontal offset from central longitudinal axis 196 on a right side of the AEP trailer, such that the at least two coupling sensors 191G may be arranged symmetrically relative to one another around central longitudinal axis 196. In some embodiments, as shown in FIG. 5C, coupling sensor(s) 191G may be located with an unobstructed line of sight to coupler 170, the tethering *nexus*, and a connection point at which the tethering *nexus* may be connected to coupler 170 when the AEP trailer is tethered. Additionally, in some embodiments, coupling sensor(s) 191G may be oriented (angled) toward coupler 170, such that a sensing area (e.g., field of view) of coupling sensor(s) 191G may be aimed at coupler 170 to more easily identify, classify, and track the tethering *nexus* and/or tethering or coupling of the tethering *nexus* to coupler 170.

Coupling Sensor Arrangements H and I

In some embodiments, as shown in FIGS. 4C and 5C, the one or more coupling sensors may include one or more coupling sensors 191H and/or one or more sensors 191I. In such embodiments, coupling sensor(s) 191H and/or 191I may be arranged on the trailer housing (e.g., on an upper surface of the forward housing). As shown in FIG. 4C, coupling sensor(s) 191H may be located at a horizontal offset greater than zero relative to central longitudinal axis 196, such that coupling sensor(s) 191H may be off-center horizontally on the AEP trailer. In some such embodiments, coupling sensor(s) 191H may comprise at least two coupling sensors 191H, one arranged with a horizontal offset from central longitudinal axis 196 on a left side of the AEP trailer and one arranged with a same horizontal offset from central longitudinal axis 196 on a right side of the AEP trailer, such that the at least two coupling sensors 191H may be arranged symmetrically relative to one another around central longitudinal axis 196. Additionally, as shown in FIG. 4C, coupling sensor(s) 191I may be centered on longitudinal axis 196. In some embodiments, as shown in FIGS. 4C and 5C, coupling sensor(s) 191H and/or 191I may be arranged to ensure an unobstructed line of sight to coupler 170, the tethering *nexus*, and a connection point at which the tethering *nexus* may be connected to coupler 170 when the AEP trailer is tethered. Additionally, in some embodiments, coupling sensor(s) 191H and/or 191I may be oriented (angled) toward coupler 170, such that a sensing area (e.g., field of view) of coupling sensor(s) 191H and/or 191I may be aimed at coupler 170 to more easily identify, classify, and track the tethering *nexus* and/or tethering or coupling of the tethering *nexus* to coupler 170.

Coupling Sensor Arrangements: Tethering *Nexus* Identification

In one or more such embodiments, the arrangement of the one or more coupling sensors of coupling sensor system 190 (e.g., coupling sensors 191A-191I) may preferably enable an improved identification, classification, and/or tracking of a tethering *nexus* during tethering operations of the AEP trailer. In some embodiments, one or more tethering *nexus* detection machine learning models may be trained to detect, identify, and/or classify a tethering *nexus* based on an input of coupling sensor data. In some such embodiments, the tethering *nexus* detection machine learning model(s) may be trained with a corpus of tethering *nexus* data samples. In some preferred embodiments, the location and/or arrangement of the one or more coupling sensors may advantageously result in the one or more coupling sensors collecting or detecting coupling sensor data that may more closely correspond to the training corpus of tethering *nexus* data samples, such that the tethering *nexus* detection machine learning model(s) may more efficiently identify, classify, and/or track the tethering *nexus*. That is, in some preferred embodiments, the one or more coupling sensors may be arranged to optimally replicate or approximate the perspective of the sensors used to capture the tethering *nexus* data samples.

As a non-limiting example, in an embodiment wherein the tethering *nexus* comprises a hitch ball to be coupled to the AEP trailer, the training corpus of tethering *nexus* data samples may include one or more hitch ball image samples that may be used to train the tethering *nexus* detection machine learning model(s) to detect or identify a hitch ball. In such an example, the one or more hitch ball images may be images captured by camera(s) arranged in a same plane and/or orientation of the hitch ball. In some such examples, coupling sensor system 190 may comprise one or more coupling sensors located on plane 194, in the same plane and orientation as the hitch ball (e.g., coupling sensors 191A-191C as shown in FIG. 5A), which may match or correspond to the plane and orientation of the camera(s) used to capture the hitch ball image samples. In such an example, the accuracy of the classification or detection of the hitch ball by the tethering *nexus* detection model(s) may be enhanced. This enhancement may be due to the arrangement and orientation of the one or more coupling sensors (e.g., on plane 194) may result in the one or more coupling sensors capturing image data that closely matches or corresponds to the hitch ball image samples used to train the tethering *nexus* detection model(s).

Trailer Orientation and Ground Reference

In some embodiments, the plurality of wheels of the autonomous electric-powered trailer system 100 may be in contact with or supported by aground surface. The autonomous electric-powered trailer system 100 may also include a trailer top (e.g., top portion), a trailer bottom (e.g., bottom portion), a trailer front (e.g., front portion), and/or a trailer back (e.g., back portion). The trailer top may be opposite the trailer bottom and further from the ground surface than the trailer bottom. The trailer bottom may be opposite the trailer top and closer to the ground surface than the trailer top. The trailer front may be opposite the trailer back and closer to a tongue (e.g., hitching assembly) of the autonomous electric-powered trailer system 100 than the trailer back. Lastly, the trailer back may be opposite the trailer front and further from the tongue of the autonomous electric-powered trailer system 100 than the trailer front.

In some embodiments, the autonomous electric-powered trailer system 100 may also include a left side and a right side. The left side may be opposite the right side and be closer to a first set of wheels (e.g., a pair of left wheels) of the autonomous electric-powered trailer system 100 than the right side. Conversely, the right side may be opposite the left side and be further from the first set of wheels than the left side (e.g., closer to a second set of wheels, such as a pair of right wheels).

Trailer Coordinate System

In some embodiments, a spatial position of the autonomous electric-powered trailer system 100 (and/or components of the autonomous electric-powered trailer system 100) may be described relative to a coordinate system. The coordinate system, in some embodiments, may be a Cartesian coordinate system comprising an X-axis (e.g., horizonal axis), a Y-axis (e.g., vertical axis), and a Z-axis (e.g., depth axis). The X-axis of the Cartesian coordinate system may be parallel to the ground surface (described above) and extend in a front-to-back direction such that X-values closer to the front of the autonomous electric-powered trailer system 100 are smaller than X-values closer to the back of the autonomous electric-powered trailer system 100.

In some embodiments, the Y-axis of the Cartesian coordinate system may be perpendicular to the ground surface and extends in a top-to-bottom direction such that Y-values closer to the ground surface are smaller than Y-values closer to the top of the autonomous electric-powered trailer system 100. Lastly, the Z-axis of the Cartesian coordinate system may be perpendicular to the X-axis and the Y-axis of the Cartesian coordinate system and extend in a right-to-left direction (e.g., side-to-side direction), such that Z-values closer to the right side of the of the autonomous electric-powered trailer system 100 are smaller than Z-values closer to the left side of the autonomous electric-powered trailer system 100.

Technical Advantages and Benefits

The coupling sensor system of the AEP trailer may include one or more sensors positioned in a variety of locations around the hitching assembly, trailer tongue, frame, or housing. While numerous placements are contemplated herein, certain arrangements may provide improved performance with respect to visibility, proximity, and the ability to monitor coupling events accurately. For example, sensors located in a region below and/or adjacent to the coupler may offer a favorable line of sight to both the tethering *nexus* and the coupling point. In such cases, the sensor may be positioned to view the interaction between the trailer coupler and the hitch ball from a vantage point that is minimally obstructed by surrounding structures.

A sensor positioned with a clear and direct viewing path to the coupling region may be better suited to identify key features of the tethering *nexus*. In some instances, the sensor may benefit from being co-planar or nearly co-planar with the hitch ball, allowing it to capture images or range data from a frontal or near-frontal perspective. This position and orientation may reduce distortion and enhance depth perception, which may in turn support more accurate alignment assessments during autonomous hitching maneuvers. Alternatively, sensors mounted at oblique angles or at greater vertical or horizontal offsets may still function, though their field of view may include visual obstructions or altered perspectives that could affect detection reliability.

In some embodiments, proximity to the coupling interface (e.g., trailer coupler) may be advantageous. A sensor located closer (e.g., proximal, adjacent, sharing a same surface or portion, etc.) to the coupling components (e.g., trailer coupler) may more effectively monitor fine-grained changes in relative position, such as whether the hitch ball is seated correctly in the trailer coupler or whether the coupler latch has engaged. Depending on the sensing modality, closer positioning may also improve spatial resolution, making it easier to detect subtle positional shifts during hitching. Conversely, sensors placed farther from the hitch point may have reduced capacity to capture these details with sufficient accuracy, particularly in environments with visual clutter or variable lighting. It shall be noted that at least one technical advantage of positioning of a tethering sensor proximal to the trailer coupler reduces the number of coupling errors (e.g., coupling failures) between the trailer coupler and the tethering *nexus* of the tow vehicle by at least 50%, 60%, 70%, 80%, 90%, and even 100% when compared to the positioning of the tethering sensor at locations not proximal to the trailer coupler (e.g., not positioned on the hitching assembly).

Physical protection of the sensors may also inform their positioning. The mechanical nature of the coupling process may introduce risk of impact or abrasion, particularly in areas where trailer structures move vertically or make contact with the tow vehicle. In this context, mounting a sensor in a location that avoids such mechanical paths-such as below the coupler or recessed along the trailer tongue—may reduce the likelihood of damage during hitching or unhitching. While sensors may be mounted in exposed areas, these configurations may benefit from additional shielding or robust housing design to ensure longevity and reliability.

Furthermore, sensor placement may influence how well the data collected aligns with any machine learning models used for tethering *nexus* identification or classification. In some embodiments, these models may be trained on visual or range data captured from particular angles, distances, or perspectives. To the extent that sensor placement approximates the perspective of the training dataset, model performance may be enhanced. While sensors in alternative locations may still operate, they may produce data with a degree of variance from the training corpus, which may affect model confidence or result in classification error.

Overall, the arrangements depicted across sensor configurations 191A through 191I may represent a subset of positions that are well-suited to coupling operations in terms of visibility, field of view, depth assessment, and alignment with sensing objectives. Other configurations may also be viable, provided they support the functional goals of the sensor system, such as reliably detecting the presence and state of the tethering *nexus*, monitoring the coupling event, and maintaining durability under operational stresses. Accordingly, while numerous sensor placements may be implemented, those located in the described regions may provide particular advantages under a range of expected use conditions.

Dynamic Sensor Movement

In some embodiments, one or more coupling sensors of the coupling sensor system may be operably mounted to a dynamic positioning mechanism configured to adjust the spatial location and/or orientation of the sensor during a tethering operation. This mechanism may comprise one or more actuators, such as linear actuators, rotational servos, telescoping arms, or articulated linkages, which may allow for movement of the sensor along one or more axes (e.g., X, Y, Z) relative to the trailer frame or tongue. In certain embodiments, the dynamic positioning mechanism may be integrated into or coupled to a mounting bracket secured to the trailer tongue, forward housing, or another structural member. The mechanism may be enclosed within a protective housing or shroud to prevent ingress of debris and to minimize mechanical exposure during travel.

The coupling sensor may be dynamically repositioned upward or downward (e.g., along the Y-axis) in response to vertical misalignment between the coupler and tethering *nexus*. For example, when the trailer is elevated on an incline or the tow vehicle is loaded with cargo, the hitch ball may deviate significantly in height relative to the nominal coupling plane. In such cases, sensor data indicating vertical misalignment beyond a threshold value may trigger downward extension of the sensor to align its field of view with the apex of the hitch ball. Conversely, when the coupler is lowered and the hitch ball is at a relatively low position, the sensor may be retracted upward to maintain line-of-sight.

Lateral repositioning of the sensor (e.g., left or right movement along the Z-axis) may be performed in response to horizontal offsets between the coupler and the tethering *nexus*, such as when the tow vehicle is approaching the trailer at an angle or on uneven terrain. In some embodiments, the sensor system may include a primary field-of-view sensor and one or more auxiliary sensors used to estimate the lateral deviation of the hitch ball. Upon detecting a lateral misalignment exceeding a predetermined offset (e.g., several centimeters from centerline), the positioning mechanism may translate the coupling sensor laterally to maintain an optimal, centered view of the coupling zone.

Forward or rearward translation along the X-axis may also be implemented in certain embodiments. This may be useful when zoom-level limitations of the sensor optics require a change in standoff distance for image acquisition. For instance, during early approach stages, the sensor may retract to a rearward position for wide-area coverage. As the tethering *nexus* nears the coupling point, the sensor may advance forward to obtain high-resolution imagery of the hitch ball and coupler interaction during final alignment and latching.

In some embodiments, the dynamic positioning of the coupling sensor may follow a staged or condition-driven progression, wherein alignment along one axis may trigger or inform subsequent adjustments along another. For example, during an initial hitching approach, the coupling sensor may be retracted rearward along the X-axis to maximize the horizontal field of view and provide wide-area coverage of the tow vehicle's tethering *nexus* as it begins to enter the sensor's detection zone. Once the tethering *nexus* is within a threshold distance or field of view boundary—e.g., as detected via object recognition or proximity sensing—the coupling sensor may transition to a forward X-axis position to obtain a more focused, high-resolution view of the hitching region.

Following such X-axis translation, the system may initiate vertical (Y-axis) adjustment to ensure the sensor is aligned with the expected vertical profile of the tethering *nexus*. For example, if the hitch ball appears in the lower third of the sensor's field of view, indicating it is positioned below the expected alignment plane, the sensor may lower vertically until the ball is centered within the image frame. This adjustment may be informed by visual feedback, machine learning-based pose estimation, or depth map analysis. In scenarios where the tow vehicle is parked on uneven terrain or is subject to suspension load variation, Y-axis movement may allow the system to maintain optimal alignment regardless of external conditions.

Subsequent to Y-axis alignment, lateral Z-axis positioning may be performed if the sensor determines that the tethering *nexus* is offset to the left or right of the trailer's longitudinal axis. In such a scenario, real-time tracking data may indicate that the tow vehicle is misaligned due to an angled reverse approach. The sensor may then translate laterally to the left or right to center the hitch ball within its sensing range and maintain the correct observation angle. In some embodiments, such lateral movement may also be used to enable stereoscopic triangulation when multiple sensors are deployed in a coordinated manner.

Furthermore, the system may operate with axis prioritization logic, where sensor movement along a secondary axis is conditionally delayed until alignment along a primary axis is within acceptable tolerances. For example, lateral (Z-axis) repositioning may be deferred until vertical alignment (Y-axis) is achieved, ensuring that the sensor's optical axis is co-planar with the hitch ball before lateral tracking is initiated. This may prevent the system from making unnecessary or compounding adjustments that could increase computational load or lead to misinterpretation of spatial data due to perspective distortion.

Additionally, once the sensor is optimally positioned along all relevant axes (X, Y, Z), the system may enter a micro-adjustment phase, wherein fine tuning of sensor orientation (e.g., pitch, yaw, or roll) is performed. This may allow the field of view to remain locked onto the tethering *nexus* even as the tow vehicle inches forward or the trailer undergoes small mechanical deflections. In some embodiments, these transitions between axis alignments may be governed by adaptive thresholds that account for environmental conditions, such as lighting, vibration, and movement uncertainty.

Through this multi-axis, staged approach, the coupling sensor system may dynamically adapt its position and orientation to maintain continuous, optimal visual or range-based tracking of the hitching interaction. This may be particularly advantageous in complex or unpredictable coupling environments, such as sloped surfaces, uneven ground, or unstructured parking spaces. As a result, the AEP trailer system may achieve more reliable and autonomous coupling, with reduced dependency on fixed sensor geometry or operator intervention.

2. Method for Automated Tethering of an Autonomous Trailer to a Tow *Nexus*

As shown by reference to FIG. 2, the method for autonomously tethering an autonomous electric trailer to a tow vehicle includes establishing a tethering proximity S205, identifying sensing data S210, computing alignment parameters S220, computing autonomous movement parameters S230, and executing autonomous operation instructions S240.

2.05 Vehicle-to-Trailer Tethering Proximity

S205, which includes establishing a tethering proximity, may function to initialize an automated pairing and/or automated tethering of an automated electric-powered (AEP) trailer and a remote tethering *nexus* (e.g., a tow hitch or the like) based on a proximity of the AEP to the tethering *nexus*. In one or more embodiments, a tethering proximity preferably relates to a defined n-dimensional distance between an AEP and tethering *nexus* within which the AEP trailer may autonomously steer and/or drive itself into a pairing or tethering position with the tethering *nexus*. That is, in one or more embodiments, an ability of the AEP trailer to autonomously move into a position for automating a coupling of the AEP trailer to a tethering *nexus* may be predicated on whether the AEP trailer is within a close enough distance or a sufficiently close distance to the tethering *nexus* to allow the AEP trailer to accurately, safely, and autonomously move towards the tethering *nexus* to automate at least part of a pairing or coupling of the AEP trailer to the tethering *nexus*.

A tethering *nexus*, as referred to herein, preferably relates to a mechanism, device, and/or system to which a coupling component (e.g., tongue coupler and the like) may establish an effective towing connection. In some embodiments, such mechanism, device, and/or system may preferably be attached to a chassis or body of a towing entity (e.g., a vehicle). Thus, in a non-limiting example, a tethering *nexus* may include, but should not be limited to, a tow hitch, a tow hitch ball, a tow hitch receiver, a tow bar, a trailer hitch, a tow pin, a tow loop, a towing pintle, and/or the like.

Pairing or Tethering Partner Identification

In one or more embodiments, establishing a tethering proximity may include identifying a pairing or tethering partner of the AEP trailer. The pairing or tethering partner, in some embodiments, may include or relate to a towing vehicle having a tethering *nexus*. However, the pairing or tethering partner, in some circumstances, may be the tethering *nexus* per se.

In one or more embodiments, identifying the pairing or tethering partner may include selecting a target pairing partner. In one embodiment, the selection of the target pairing partner may be performed by a user via providing one or more pairing inputs to a user interface of a remote device, a pairing interface of the AEP trailer, or by remotely (i.e., via a remote control) or manually arranging the AEP trailer and/or the tethering *nexus* in a predetermined manner or distance that allows the AEP trailer to positively identify its pairing partner based on its relative arrangement to a target tethering *nexus*. For instance, in a non-limiting example, the AEP trailer may obtain or receive one or more inputs from a user indicating the desired paring partner for the AEP trailer, such as a license plate number of the desired paring partner, a make or model of the desired pairing partner, a color of the desired pairing partner, and/or the like. In turn, the AEP trailer may implement one or more vision-based machine learning models to identify (e.g., detect) an object or entity within a scene of the AEP trailer having such characteristics and select that object or entity as the target pairing partner for the AEP trailer.

Additionally, or alternatively, S205 may function to enable the AEP trailer to compute or predict one or more pairing candidates that may be presented, via a pairing user interface or the like, to a user that may select and/or confirm one of the one or more pairing candidates. For instance, in a non-limiting example, the AEP trailer may function to capture one or more images of one or more objects or entities proximal to the AEP trailer and transmit these one or more images to a user for review, selection, or confirmation. Thus, in some embodiments, a user input confirming or selecting an image of a distinct object may cause the AEP trailer to select (or identify) that object or entity as the target pairing partner for the AEP trailer.

In a varying example, the AEP trailer may function to capture an image of a license plate associated with one or more objects or entities proximal to the AEP trailer and, in turn, transmit these one or more images to a user for review, selection, or confirmation. Thus, in some embodiments, a user input confirming or selecting an image of a distinct license plate may cause the AEP trailer to select (or identify) the object or entity associated with that distinct license plate as the target pairing partner for the AEP trailer. It shall be recognized that method 200 may communicate with one or more external systems to aid the AEP trailer or the user in selecting or identifying a target pairing partner, such as a department of motor vehicles (DMV) database or the like.

As described in more detail herein, in a preferred implementation, an identification of a target pairing partner may be performed by the AEP trailer using computer vision-based perception. In such embodiments, the computer vision-based perception of the AEP trailer may be implemented using one or more trained machine learning models (e.g., convolution neural networks) that may be specifically trained to predict and/or classify a suitable tethering partner for the AEP trailer. That is, in one or more embodiments, one or more vision-based machine learning algorithms may be trained using a corpus of data samples comprising sample images of tethering partners (e.g., tow hitches and the like), such that once the one or more vision-based machine learning algorithms are trained, the resulting vision-based machine learning model(s), when operated by the AEP trailer, may function to classify and identify a tethering partner or tethering *nexus*. In some embodiments, the vision-based machine learning model(s) may function to receive, as input, sensor data (e.g., sensor data from coupling sensor system 190 and/or sensor suite 150), and, in turn, the vision-based machine learning model(s) may function to identify or detect a tethering partner or tethering *nexus* based on the sensor data (e.g., by detecting or classifying a tethering *nexus* comprising a tow hitch, and/or the like, in image sensor data).

Pairing Proximity Threshold

In one or more embodiments, establishing the tethering proximity may further include identifying whether the AEP trailer satisfies a pairing proximity threshold. In such embodiments, the pairing proximity threshold preferably relates to a maximum distance between an AEP trailer and a target pairing candidate (e.g., a tethering *nexus*) that, if exceeded, may disable an automated pairing or tethering of the AEP trailer to the target pairing candidate. Stated differently, the pairing proximity threshold, if satisfied (e.g., at or below the maximum distance), may enable or cause an automated execution of pairing or tethering operations of the AEP trailer.

Accordingly, in some embodiments, identifying whether the pairing proximity threshold is satisfied includes computing a pairing distance between the AEP trailer and a towing entity. Preferably, S205 may function to identify an n-dimensional coordinate or position of a target tethering *nexus* and an n-dimensional coordinate of a coupler (e.g., towing coupler) of the AEP trailer and compute a pairing distance based on a difference between the n-dimensional coordinates of the coupler of the AEP trailer and the tethering *nexus*.

In one embodiment, if a computed pairing distance satisfies the pairing proximity threshold, S205 may function to identify or set the AEP trailer in a first state, such as setting the AEP trailer to an in-pairing position state (i.e., a pairing ready state). In such embodiments, when the AEP trailer may be in an in-pairing position state, S205 may function to generate a pairing signal that may cause an execution of an automated workflow or automated tethering sequence. Alternatively, if a computed pairing distance does not satisfy the pairing proximity threshold, S205 may function to identify or set the AEP trailer in a second state, such as setting the AEP trailer to an out-of-pairing position state. In the out-of-pairing position state, S205 may function to generate one or more signals for reporting (or indicating) that automated tethering or pairing may not yet be enabled because of a failed pairing proximity.

2.10 Sensing Data for Automated Tethering

S210, which includes sourcing sensing data, may function to identify or collect one or more streams of sensing data from one or more sensing sources (i.e., sensors). In one or more embodiments, the one or more sensors may include sensors positioned or mounted on the AEP trailer (i.e., onboard sensors). In a variation of such embodiments, S210 may include at least one sensor arranged on a target towing entity or a target tethering *nexus* to improve a fidelity and/or robustness of the sensing data sourced for autonomous tethering and/or autonomous driving operations of the AEP trailer. Additionally, or alternatively, the one or more sensing sources may include one or more remote data feeds (e.g., weather feed, traffic feed, etc.), a remote autonomous trailer service or platform (e.g., remote servers, cloud computing servers, etc. for remotely managing and/or informing an operation of an AEP trailer), and any other suitable sensing source accessible to the AEP trailer. In some embodiments, the one or more sensing sources may include sensor suite 150 and/or coupling sensor system 190.

In one implementation, S210 may function to implement one or more sensors (e.g., one or more cameras) mounted on the AEP trailer to collect sensor data identifying a position of one or more of a coupler of the AEP trailer and a target tethering *nexus* of a towing entity or the like. In this implementation, the one or more sensors may include one or more onboard cameras in which the respective field of view for each camera may be angled to include both the coupler of the AEP trailer and a trailer tow hitch or the like of a tow vehicle. In this way, the one or more sensors may collect data that may identify a relative position of the coupler of the AEP trailer and the tethering *nexus* (of a tow vehicle or the like). In some preferred embodiments, as shown by way of example in FIGS. 5A-5C, the one or more sensors may include one or more coupling sensors arranged in horizontal plane below the coupler of the AEP trailer. In some such embodiments, the tethering *nexus* may lie within the same horizontal plane as the one or more coupling sensors, such that the coupling sensors may have an unobstructed line of sight to the coupler and the tethering *nexus*. Additionally, in some preferred embodiments, the one or more coupling sensors may be arranged adjacent to the coupler to provide more accurate sensing data of the coupler and the tethering *nexus* (e.g., during tethering and untethering operations of the AEP trailer).

In a second implementation, sourcing sensor data may include implementing a combination of onboard sensors mounted on the AEP trailer and one or more remote (offboard) sensors mounted on or proximate to the tethering *nexus*. In this second implementation, S210 may function to collect distinct streams of sensor data from each of the onboard sensors and remote sensors to define a corpus of sensor data for one or more downstream computations (e.g., S220-S240 and the like). In one example, a remote sensor or offboard sensor may be positioned with a field of view of at least the tethering *nexus* while the one or more onboard sensors may function to collect sensor data associated with a position or arrangement of the AEP trailer. It shall be recognized that in a preferred embodiment, sensor data as referred to herein may include, but should not be limited to, any data observed or collected by a sensor suite and/or coupling sensor system of a target AEP trailer (or like vehicle), a tow vehicle, an external sensor system (e.g., a mobile device), a third-party sensing system, and/or the like.

In a third implementation, a pairing target such as a tethering *nexus* and/or towing vehicle may have a distinct positioning indicia (e.g., a visual aid, fiducials, and/or the like) applied to a visible or observable surface. In such embodiments, S210 may function to source sensor data by observing a position of the distinct positioning indicia on either or both of the tethering *nexus* and towing vehicle.

In a fourth implementation, a pairing target such as a tethering *nexus* and/or towing vehicle may emit a positioning signal or a beacon. In such embodiments, S210 may function to implement one or more sensors that identify and/or observe the beacon contemporaneously with an automated trailer-to-vehicle tethering process of the AEP trailer.

In some embodiments, the sensing data of S210 may be continuously collected (e.g., sensed, captured, etc.) as the AEP trailer system 100 is in the process of physically tethering the hitching assembly of the AEP trailer system 100 to the tethering *nexus* of the tow vehicle. As described herein, during the process of tethering the hitching assembly of the AEP trailer system 100, AEP trailer system 100 may autonomously move along an X-axis of the AEP trailer system 100 (e.g., an axis extending parallel to the ground surface that supports the plurality of wheels). For instance, in some embodiments, the AEP trailer system 100 may begin at an initial X-position (e.g., a starting distance away from the tethering *nexus*). As the AEP trailer system 100 moves forward along the X-axis, the hitching assembly progressively approaches the tethering *nexus*. During such movement, the AEP trailer system 100 may pass through the initial X-position to a second X-position, third X-position, and so on until the hitching assembly reaches a final X-position that is within a threshold distance of tethering *nexus*. It shall be noted that each successive X-position along this path may represent a closer proximity to the tethering *nexus*.

As the AEP trailer system 100 advances along these incremental X-positions, the tethering sensor may capture multiple images of the tethering *nexus* at different distances. For example, at the initial X-position, the tethering sensor may capture a first image of the tethering *nexus*, where the tethering *nexus* appears at a relatively smaller size within the image frame due to the greater distance. As the AEP trailer system 100 moves forward to the second X-position, the sensor may capture a second image, where the tethering *nexus* appears larger due to the reduced distance between the sensor and the tethering *nexus*. Similarly, as the system moves to the third X-position and beyond, the captured images will continue to show an increasing pixel representation of the tethering *nexus*.

In some embodiments, this increase in pixel representation may be quantified by comparing the number of pixels corresponding to the tethering *nexus* in successive images. Specifically, as the AEP trailer system 100 moves closer along the X-axis, the tethering sensor detects a larger apparent size of the tethering *nexus*, resulting in a greater number of pixels representing the tethering *nexus* in each successive image. This progressive increase in pixel representation provides a confirmation to the AEP trailer system 100 that the hitching assembly is advancing toward proper alignment and coupling with the tethering *nexus*.

2.20 AEP Trailer-to-Tether Alignment Parameters

S220, which includes computing alignment parameters, may function to compute alignment parameters and/or autonomous control instructions for creating an alignment between the AEP trailer and tethering *nexus*. That is, upon establishing a tethering proximity and/or detecting that the AEP trailer may be in an out-of-alignment state with respect to a target tethering *nexus*, S220 may function to generate steering and/or motor control instructions to cause the AEP trailer to autonomously move into an in-alignment state. Trailer-to-vehicle or trailer-to-tether alignment, as referred to herein, generally relates to an arrangement between a position of a coupler of an AEP trailer and a tethering *nexus* (of a tow vehicle) that preferably positions the coupler of the AEP and the tethering *nexus* in a center of a sensing environment. In a non-limiting example, a trailer-to-tether alignment may be achieved when a position of a tow hitch of a tow vehicle and a tongue coupler of an AEP trailer are arranged in a center of image data sensed by one or more onboard cameras (e.g., coupling sensors) of the AEP trailer.

In a first implementation, S220 may function to compute alignment parameters based on an n-dimensional position of the tethering *nexus*. In this first implementation, S220 may function to compute an n-dimensional position of a target tethering *nexus* based on sensor data. In such embodiments, computing the n-dimensional position of the target tethering *nexus* may include measuring and/or calculating a three-dimensional position of the tethering *nexus* that preferably includes an X-Y coordinate of the tethering *nexus* and a Z coordinate (i.e., a height value relative to a driving surface). In some embodiments, measuring the n-dimensional position of the tethering *nexus* may include converting a position and size of a tethering *nexus* and/or tow vehicle within the sensor data (e.g., camera images of the tow vehicle) into a relative position and distance of the tethering *nexus* from the AEP trailer.

Additionally, or alternatively, the alignment parameters preferably include computer-executable instructions that, when executed, control one or more of a battery stack (e.g., electric outputs), one or more motors (for torque generation, wheel adjustments), steering components (for wheel and/or axle/caster wheel adjustments), lifting components (e.g., a jack), and/or any component of the AEP trailer that may be manipulated electronically. Accordingly, S220 may function to compute alignment parameters that may include steering and/or motor control instructions that, when executed, generates propulsion in the one or more motors for moving the one or more wheels of the AEP trailer into a trailer-to-tether alignment.

In a second implementation, S220 may function to compute alignment parameters based on alignment signals emitted by a target tethering *nexus*, tow vehicle, and/or a beacon associated with the tethering *nexus*. In this second implementation, the alignment signals may include two or more infrared beams or the like emitted from a (single) beam source (e.g., the tethering *nexus*), which may form alignment traveling boundaries, such as emissions that define a V-shape or a shape substantially similar to a V-shape. Accordingly, computing alignment parameters may include calculating a vertex of the V-shaped emissions and generating alignment control instructions that, when executed, cause the AEP trailer to steer its coupler into alignment with the vertex of the V-shaped emissions.

2.30 AEP Trailer-to-Tether Driving Control Parameters

S230, which includes computing trailer-to-tether autonomous driving parameters, may function to generate autonomous trailer driving instructions that, when executed, cause the AEP trailer to autonomously steer and drive to a tethering point for an automated tethering or connection of a coupler of the AEP trailer to a target tethering *nexus*.

In one or more embodiments, the automated tethering arrangement, AEP trailer coupler-to-tether arrangement, or connection point generally refers to a position and/or arrangement in which a coupler of an AEP trailer and a tethering *nexus* may be in an imminent coupling alignment, such that the coupler of the AEP trailer and the tethering *nexus* may be in an overlapping arrangement in which the coupler is positioned over a top surface of the tethering *nexus*. In such embodiments, a movement of the coupler of the AEP trailer in a direction normal or perpendicular to and toward a surface of tethering *nexus* may cause the coupler and the tethering *nexus* to physically contact or connect. That is, in the automated tethering arrangement the physical pairing or mating of the coupler of the AEP and the tethering *nexus* of a tow vehicle may be achieved by automatically reducing a height of the coupler until the coupler physically engages and/or encapsulates part or all of the tethering *nexus*. Additionally, or alternatively, the AEP trailer coupler-to-tether arrangement may be achieved when the coupler of the AEP trailer is moved within a threshold distance of the tethering *nexus* (e.g., 6 inches, 1 foot, 1.5 feet, 2 feet, 3 feet, 6 feet, etc. from the tethering *nexus*). It shall be noted that, in some portions of the disclosure, the AEP trailer may be described as being adjacent or proximal to the tethering *nexus* when the coupler of the AEP trailer is moved within the threshold distance of the tethering *nexus*.

Alternatively, in some embodiments, the automated tethering arrangement or connection point may include a position in which a coupler of the AEP trailer and a tethering *nexus* of a tow vehicle may be in axial alignment. In such embodiments, a movement of the coupler of the AEP trailer along a shared or common axis (e.g., a central axis of both the AEP trailer and tethering *nexus*) may place the coupler and the tethering *nexus* in physical contact connection.

Additionally, or alternatively, S230 may function to generate a route plan that may include one or more of a starting condition (e.g., tethering proximity established, trailer-to-tether alignment, etc.), driving behavior policy (e.g., path estimation, driving speed, steering, etc.), and a stopping condition (e.g., automated tethering arrangement) that may enable the AEP trailer to successfully and autonomously travel to the tethering *nexus* to establish an automated tethering arrangement that enables the AEP to physically connect the AEP coupler to a target tethering *nexus*.

Accordingly, in one or more embodiments, computing trailer-to-tether autonomous driving parameters may include generating (i) motor control instructions (e.g., X-axis positioning instructions) which may influence driving and/or steering, (ii) steering instructions to influence a moving direction (e.g., Y-axis positioning instructions), and (iii) braking instructions to influence discontinuation or reduction in a velocity of a motion of an AEP trailer.

In one implementation, the AEP trailer may include at least one wheel on each side that includes a motor or is controlled by an independent motor that produces torque for propulsion. In such embodiments, generating the motor control instructions may include generating distinct motor control instructions for each motor at either side of the AEP trailer. In such embodiments, S230 may function to generate motor control instructions for generating torque for both steering and propulsion. In a non-limiting example, to affect a steering of an AEP trailer, S230 may function to generate motor control instructions that produces a torque in a first motor of a first wheel, such as a right wheel, that is greater that a torque produced in a second motor of a second wheel, such as a left wheel. In such an example, the generation of excess torque on one side of the AEP trailer may result in a steering effect depending on the direction of excess torque. In this example, a chassis of the AEP trailer may include a steerable axle or caster wheel that enables a steering of the AEP trailer based on the generation of the excess torque.

In another implementation, one or more pairs of corresponding wheels defining a left and right wheel pair of the AEP trailer may be driven by a same motor and the AEP trailer may further include a steerable axle or a caster wheel that may be actively operated or driven for steering a directional movement of the AEP trailer towards a tethering *nexus*. In such embodiments, S230 may function to generate motor control instructions that, when executed, generate propulsion in the wheels of the AEP trailer and further generate steering instructions that, when executed, control a steering direction of the steerable axle or caster wheel of the AEP trailer. In a variation of this implementation, the AEP trailer may not include an active steering axle. In such variation, an autonomous steering operation of the AEP trailer may be performed or achieved based on a control and application of differential braking of a pair of opposing (e.g., left vs. right wheel) wheels of the AEP trailer. In such embodiments, a single motor may provide a constant or same torque to the pair of opposing wheels while a braking operation is applied to one wheel of the pair of opposing wheels thereby enabling a movement of the second wheel of the pair of opposing wheels and, further, a steering of the AEP trailer in a rotational manner since the one wheel having a braking operation applied thereto may act as a pivot for a rotational movement or steering of the AEP trailer.

Additionally, or alternatively, generating autonomous trailer driving instructions may include generating braking instructions. In one or more embodiments, S230 may function to generate dynamic braking instructions in response to environmental conditions and/or the detection of dynamic or static objects along a route of the AEP trailer. In a preferred embodiment, S230 may function to generate braking instructions based on achieving a stopping condition of a route plan for the AEP trailer. That is, contemporaneous with (e.g., before and during) an arrival of the AEP trailer to an automated tethering arrangement or position with the tethering *nexus*, S230 may generate braking instructions that, when executed, causes the AEP trailer to autonomously apply braking forces to one or more of its wheels.

Additionally, or alternatively, generating autonomous trailer driving instructions may include generating jack control instructions (e.g., Z-axis positioning instructions) that, when executed by the AEP trailer, cause a change in a height control mechanism (e.g., a jack) of the AEP trailer. In one or more embodiments, a height control mechanism may be arranged along or near a steerable axle of the AEP trailer. In such embodiments, S230 may function to compute jack control instructions that enable the height control mechanism of the AEP trailer to clear the tethering *nexus* and further, enable the coupler of the AEP trailer to arrange itself in an automated tethering arrangement, such as being arranged over a top surface of the tethering *nexus*. In some embodiments, the jack control instructions may enable an axial alignment between the tethering *nexus* and the coupler of the AEP trailer to enable a successful coupling.

Additionally, or alternatively, in some embodiments, a trailer implementing method 200 may comprise a radar sensor (e.g., tethering sensor) configured to emit and receive radio frequency signals to detect one or more characteristics of the towing vehicle's hitch ball. The radar sensor may utilize the Doppler effect to measure relative velocity and may further determine distance, angle, and position of the hitch ball relative to the trailer chassis or coupling interface. Radar signal data, including time-series returns and velocity shifts, may be processed and formatted as input features for a deep neural network (DNN).

The DNN may be trained using supervised or semi-supervised learning techniques on labeled datasets comprising radar signatures corresponding to known hitch ball positions, distances, velocities, and orientations. Training data may include synthetic or real-world radar capture scenarios under varying lighting, environmental, and motion conditions to improve generalization and robustness. The DNN may be configured to output one or more prediction vectors, such as a three-dimensional position estimate of the hitch ball, angle of approach, and velocity profile, which may be used to infer real-time spatial relationships and motion intent.

Based on the DNN outputs, the trailer system 100 may generate a set of autonomous control commands to facilitate hitch alignment and connection. These commands may include jack actuation signals (e.g., raise or lower), steering adjustments (e.g., wheel angle or caster rotation), motor control, braking inputs (e.g., soft stop or active braking), and parking brake engagement or release. In some embodiments, the control logic may operate in a closed feedback loop, continuously refining the hitching process based on updated radar readings and DNN inferences to achieve accurate and safe alignment.

2.40 Autonomous Tethering

Figure 3:
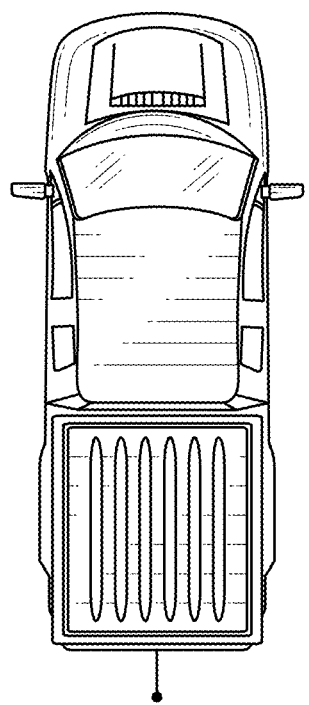
FIG. 3 illustrates an example schematic for automated tethering in accordance with one or more embodiments of the present application.
Figure 3:
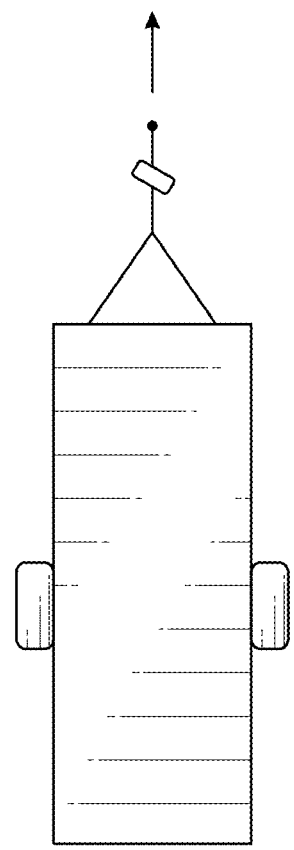

S240, which includes automatically tethering an AEP trailer to a tethering *nexus*, may function to execute a composition of autonomous trailer operating controls and/or instructions that enable the AEP trailer to automatically (i.e., without human intervention) tether a coupler of the AEP trailer to a separate tethering *nexus* (e.g., a tow hitch ball or the like of a tow vehicle), as shown by way of example by FIG. 3. In a preferred embodiment, an automated tethering operation may be based on the AEP trailer sensing a position of a target tethering *nexus* within a tethering proximity and generating autonomous control and tethering instructions (based on the sensing) that, when executed by the AEP trailer, causes the AEP trailer to autonomously drive and/or steer into an automated tethering position in which the coupler of the AEP trailer system may come into physical contact and connect to the target tethering *nexus*.

In one or more embodiments, the AEP trailer starting in an un-tethered state may function to compute a position of a target tethering *nexus* based on sensor data collected by one or more sensors of the AEP trailer. In such embodiments, S240 may function to calculate a position and/or size of a tethering *nexus* (or tow entity) and algorithmically convert the position and/or size data into relative position and distance information (e.g., coordinates) of the tethering *nexus* from a coupling device of the AEP trailer. As described herein, the relative position and distance information may be used to establish a tethering proximity and/or perform an alignment of the AEP trailer to the tethering *nexus*.

Additionally, or alternatively, the sensor data and/or artifacts derived from sensor data may be streamed or used as input to an onboard computer system of the AEP trailer, which may, in turn, generate autonomous tethering instructions. The autonomous tethering instructions may, in such embodiments, include control instructions for directing power output from one or more batteries of the AEP trailer to drive one or more electric motors that operate the wheels of the AEP trailer. Stated differently, S240 may function to compute driving and/or steering instructions that, when executed, enable the AEP trailer to autonomously drive and steer from an un-tethered state to a tethering state and, further, into a tethered state.

In an un-tethered state, a coupler of the AEP trailer may not be physically connected or tethered to a tethering *nexus*, such as a tow hitch of a tow vehicle. In a tethering state, a coupler of the AEP trailer may be in a position for imminent connection with a target tethering *nexus*. An imminent connection, as referred to herein, preferably relates to a state in which a coupler of the AEP trailer has been autonomously moved into a position (e.g., coupler overlapping the tethering *nexus*) in which an execution of control instructions by the AEP trailer for controlling a height of the coupler of the AEP trailer may likely create physical contact and/or a connection between the coupler and a target tethering *nexus*. In a tethered state, as referred to herein, a coupler of the AEP trailer and a target tethering *nexus* may be in physical contact and/or connection (e.g., the coupler is locked into place with the tethering *nexus*).

In one or more embodiments, if or when it is determined that a coupler of the AEP trailer may be in a tethering state with a tethering *nexus* of a tow entity or the like, S240 may function to generate and transmit a coupling (pairing or tethering) signal that causes a cranking and/or jacking mechanism at or near the coupler of the AEP trailer to automatically adjust a height of the coupler until a physical engagement between the coupler and the tethering *nexus* is achieved. In one or more embodiments, S240 may function to trigger a stopping condition that terminates the height adjustment based on sensing one or more loads and/or detecting a successful connection (or contact) between the coupler of the AEP trailer and the target tethering *nexus*.

Additionally, or alternatively, it shall be recognized that an autonomous tethering of a coupler of the AEP trailer and a target tethering device may be initiated, by the AEP trailer, in any suitable manner including, but not limited to, by user input onto an external trailer interface, user input or command to a remote device (e.g., a mobile device having an AEP trailer application), an input interface of a tow entity, and/or the like.

Additionally, or alternatively, S240 may function to terminate, pause, and/or stop an automated tethering between an AEP trailer and a target tethering *nexus* based on varying circumstances that may cause the automated tethering to be unsuitable, unsafe, and/or dangerous. For instance, in a case of a potential collision with an object, S240 may function to automatically terminate an automated tethering operation to prevent the AEP trailer from a likely collision with an object.

It shall be recognized that, in various embodiments, an automated tethering operation and/or process, including autonomous driving operations, of the AEP trailer may include an iterative process, which include one or more feedback loops or systems that may continuously assist the autonomous driving and/or autonomous tethering computations of the AEP trailer. In such embodiments, one or more of steps of the method 200 (i.e., S205-S240) may be performed one or more instances (or in a repeating manner) either sequentially or non-sequentially to support a generation of autonomous control instructions for driving, steering, and/or the automated tethering of the AEP trailer to a tethering *nexus* or the like.

It shall also be recognized that while in various embodiments the AEP trailer includes a trailer that is typically designed to be hauled or towed, in some embodiments, the AEP trailer may be a recreational vehicle (RV) or recreational trailer (e.g., the RV may serve as a mobile home with wheels, a temporary dwelling with wheels, place of business, and/or the like). In one or more embodiments, the RV or recreational trailer may include internal space as sleeping or living quarters for humans and/or pets.

Thus, in some embodiments, the method 200 may function to move the AEP trailer from an untethered state to the tethering state based at least on detecting or determining that the AEP trailer is in an undeployed or a movable state. In such embodiments, the AEP trailer may function to remain in the untethered state until the AEP trailer detects or determines that the AEP trailer is no longer in a deployed or immovable state.

In some embodiments, the AEP trailer may be in the deployed or immovable state when the method 200 detects that one or more AEP trailer objects are (currently) in-use or deployed. For instance, in a non-limiting example, the method 200 may detect or determine that the AEP trailer is in a deployed or immovable state when a door of the AEP trailer is detected in an open state, one or more entities are detected in the AEP trailer, one or more stairs of the AEP trailer are detected in an expanded state, an awning of the AEP trailer is an expanded state, one or more AEP trailer utility components (e.g., charging components, water utilities, and/or the like) are determined to be connected to one or more external sources, and/or the like.

Conversely, in some embodiments, the AEP trailer may be in the undeployed or movable state when the method 200 detects that one or more AEP trailer objects are undeployed (e.g., not in-use). For instance, in a non-limiting example, the method 200 may detect or determine that the AEP trailer is in the undeployed or movable state when a door of the AEP trailer is detected in a closed state, one or more stairs of the AEP trailer are detected in a retracted state, an awning of the AEP trailer is in a retracted state, one or more AEP trailer utility components (e.g., charging components, water utilities, and/or the like) are determined to be disconnected from the one or more external sources, and/or the like.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. An autonomous electric-powered (AEP) trailer comprising:
 a trailer chassis;
 a trailer enclosure supported by the trailer chassis;
 a trailer hitching assembly coupled to the trailer chassis, wherein the trailer hitching assembly comprises:
  a trailer coupler, and
  a tethering sensor configured to sense in a direction toward a tethering *nexus* of a tow vehicle; and
 a processing unit that uses sensing data sensed by the tethering sensor to autonomously control a physical tethering of the trailer coupler to the tethering *nexus* of the tow vehicle.

2. The AEP trailer according to claim 1, wherein:
 the tethering sensor comprises an image sensor, and
 sensing in the direction toward the tethering *nexus* of the tow vehicle at least includes:
  capturing an image of the tethering *nexus* from a viewing angle that is perpendicular to the tethering *nexus*.

3. The AEP trailer according to claim 1, wherein:
 the tethering sensor comprises an image sensor,
 an optical axis of the image sensor extends from a center of a lens of the image sensor and is perpendicular to the tethering *nexus*, and
 a field of view of the image sensor includes the tethering *nexus* and does not include the trailer coupler.

4. The AEP trailer according to claim 1, wherein:
 the tethering *nexus* includes a hitch ball,
 a maximum height of the hitch ball is defined as a perpendicular distance from a ground surface supporting a plurality of wheels of the AEP trailer to an apex of the hitch ball,
 a minimum height of the hitch ball is defined as a perpendicular distance from the ground surface to a nadir of the hitch ball, and
 at least a portion of the tethering sensor is positioned between the maximum height of the hitch ball and the minimum height of the hitch ball when the trailer coupler is physically tethered to the tethering *nexus* of the tow vehicle.

5. The AEP trailer according to claim 4, wherein the portion of the tethering sensor is not between the maximum height of the hitch ball and the minimum height of the hitch ball when the trailer coupler is not physically tethered to the tethering *nexus* of the tow vehicle.

6. The AEP trailer according to claim 1, wherein:
the tethering *nexus* includes a hitch ball,
a hitch ball apex plane extends tangential to an apex of the hitch ball and is parallel to a ground surface that supports a plurality of wheels of the AEP trailer,
a hitch ball nadir plane extends tangential to a nadir of the hitch ball and is parallel to the ground surface, and
at least a portion of the tethering sensor is positioned between the hitch ball apex plane and the hitch ball nadir plane when the trailer coupler is physically tethered to the tethering *nexus* of the tow vehicle.

7. The AEP trailer according to claim 1, wherein:
a plurality of wheels of the AEP trailer are supported by a ground surface,
the trailer hitching assembly includes a top portion and a bottom portion opposite the top portion, wherein the bottom portion of the trailer hitching assembly is closer to the ground surface than the top portion of the trailer hitching assembly,
the trailer coupler is coupled to the top portion of the trailer hitching assembly, and
the tethering sensor is coupled to the bottom portion of the trailer hitching assembly.

8. The AEP trailer according to claim 7, wherein:
the AEP trailer comprises a front and a back opposite the front,
the trailer hitching assembly comprises a trailer hitching assembly length measured in a front-to-back direction,
the trailer coupler extends from a starting position to an ending position along the trailer hitching assembly length, wherein the starting position of the trailer coupler is closer to the back of the AEP trailer than the ending position of the trailer coupler,
the tethering sensor extends from a sensor starting position to a sensor ending position along the trailer hitching assembly length, wherein the starting sensor position of the tethering sensor is closer to the back of the AEP trailer than the sensor ending position of the tethering sensor,
the sensor starting position is closer to the back of the AEP trailer than the starting position of the trailer coupler, and
the ending position of the trailer coupler is closer to the front of the AEP trailer than the sensor ending position.

9. The AEP trailer according to claim 7, wherein:
the AEP trailer further includes a caster wheel coupled to the trailer hitching assembly,
the trailer coupler and the tethering sensor are closer to a front of the AEP trailer than the caster wheel, and
the tethering sensor is positioned on the bottom portion of the trailer hitching assembly adjacent to the trailer coupler.

10. The AEP trailer according to claim 1, wherein:
the AEP trailer includes an X-axis parallel to a ground surface supporting a plurality of wheels of the AEP trailer;
the sensing data sensed by the tethering sensor at least includes:
   a first image of the tethering *nexus* captured when the trailer coupler is at a first position along the X-axis, and
   a second image of the tethering *nexus* captured when the trailer coupler is at a second position along the X-axis, closer to the tethering *nexus* than the first position; and
a pixel representation of the tethering *nexus* in the second image is greater than in the first image.

11. The AEP trailer according to claim 10, wherein the pixel representation of the tethering *nexus* in the second image is greater than in the first image when a number of pixels corresponding to the tethering *nexus* in the second image is greater than a number of pixels corresponding to the tethering *nexus* in the first image.

12. The AEP trailer according to claim 1, wherein using the sensing data to autonomously control the physical tethering of the trailer coupler to the tethering *nexus* of the tow vehicle includes:
   (1) identifying, via the processing unit, a real-world position of the tethering *nexus* based on the sensing data,
   (2) computing, via the processing unit, computer-executable tethering instructions based on the real-world position of the tethering *nexus*,
   (3) actuating, via the processing unit, a plurality of wheels of the AEP trailer in accordance with the computer-executable tethering instructions, and
   (4) repeating (1)-(3) until the trailer coupler is connected to the tethering *nexus* of the tow vehicle.

13. The AEP trailer according to claim 12, wherein:
the AEP trailer comprises an X-axis parallel to a ground surface supporting a plurality of wheels of the AEP trailer, and
the computer-executable tethering instructions at least includes an X-axis positioning instruction that defines a target voltage to apply to the plurality of wheels for aligning the trailer coupler to an X-position of the tethering *nexus* along the X-axis.

14. The AEP trailer according to claim 13, wherein:
the AEP trailer comprises a Y-axis perpendicular to the ground surface supporting a plurality of wheels of the AEP trailer, and
the computer-executable tethering instructions further define a Y-axis positioning instruction that defines the target voltage to apply to the plurality of wheels for aligning the trailer coupler to a Y-position of the tethering *nexus* along the Y-axis.

15. The AEP trailer according to claim 14, wherein:
the AEP trailer comprises a Z-axis perpendicular to the X-axis and the Y-axis, and
the computer-executable tethering instructions further define a Z-axis positioning instruction that defines an amount to jack the trailer hitching assembly to align the trailer coupler over the tethering *nexus* along the Z-axis.

16. A trailer comprising:
a trailer chassis;
a trailer enclosure supported by the trailer chassis;
a trailer hitching assembly coupled to the trailer chassis, wherein the trailer hitching assembly comprises:
   a trailer coupler, and
   a tethering sensor configured to sense in a direction toward a tethering *nexus* of a tow vehicle; and
a processing unit that uses sensing data sensed by the tethering sensor to autonomously control a physical tethering of the trailer coupler to the tethering *nexus* of the tow vehicle.

17. The trailer according to claim 16, wherein:
the tethering sensor comprises an image sensor, and
sensing in the direction toward the tethering *nexus* of the tow vehicle at least includes:

capturing an image of the tethering *nexus* from a viewing angle that is substantially perpendicular to the tethering *nexus*.

18. The trailer according to claim 16, wherein:
the tethering sensor comprises an image sensor,
an optical axis of the image sensor extends from a center of a lens of the image sensor and is substantially perpendicular to the tethering *nexus*, and
a field of view of the image sensor includes the tethering *nexus* and does not include the trailer coupler.

19. The trailer according to claim 16, wherein:
a plurality of wheels of the trailer are supported by a ground surface,
the trailer hitching assembly includes a top portion and a bottom portion opposite the top portion, wherein the bottom portion of the trailer hitching assembly is closer to the ground surface than the top portion of the trailer hitching assembly,
the trailer coupler is coupled to the top portion of the trailer hitching assembly, and
the tethering sensor is coupled to the bottom portion of the trailer hitching assembly.

20. The trailer according to claim 19, wherein:
the trailer comprises a front and a back opposite the front,
the trailer hitching assembly comprises a trailer hitching assembly length measured in a front-to-back direction,
the trailer coupler extends from a starting position to an ending position along the trailer hitching assembly length, wherein the starting position of the trailer coupler is closer to the back of the trailer than the ending position of the trailer coupler,
the tethering sensor extends from a sensor starting position to a sensor ending position along the trailer hitching assembly length, wherein the sensor starting position of tethering sensor is closer to the back of the trailer than the sensor ending position of the tethering sensor,
the sensor starting position is closer to the back of the trailer than the starting position of the trailer coupler, and
the ending position of the trailer coupler is closer to the front of the trailer than the sensor ending position.

* * * * *